(12) United States Patent
Van et al.

(10) Patent No.: US 10,212,488 B2
(45) Date of Patent: Feb. 19, 2019

(54) CHANNEL-BASED METHOD AND SYSTEM FOR RELAYING CONTENTS

(71) Applicant: KAKAO CORP., Jeju-si (KR)

(72) Inventors: Seung Hwan Van, Seoul (KR); Doo Shik Chung, Seongnam-si (KR); Bo Ra Lim, Seoul (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 15/032,006

(22) PCT Filed: Oct. 22, 2014

(86) PCT No.: PCT/KR2014/009950
§ 371 (c)(1),
(2) Date: Aug. 16, 2016

(87) PCT Pub. No.: WO2015/060640
PCT Pub. Date: Apr. 30, 2015

(65) Prior Publication Data
US 2016/0360287 A1 Dec. 8, 2016

(30) Foreign Application Priority Data

Oct. 25, 2013 (KR) .......... 10-2013-0128008
Oct. 25, 2013 (KR) .......... 10-2013-0128023
Oct. 25, 2013 (KR) .......... 10-2013-0128044

(51) Int. Cl.
*H04N 21/81* (2011.01)
*G06Q 30/02* (2012.01)
(Continued)

(52) U.S. Cl.
CPC ....... *H04N 21/812* (2013.01); *G06Q 30/0241* (2013.01); *G06Q 30/0269* (2013.01);
(Continued)

(58) Field of Classification Search
CPC ............. H04N 21/812; G06Q 30/0241; G06Q 30/0269
See application file for complete search history.

(56) References Cited

U.S. PATENT DOCUMENTS

| | | | | |
|---|---|---|---|---|
| 2002/0144273 | A1* | 10/2002 | Reto | H04L 29/06027 725/86 |
| 2012/0190386 | A1* | 7/2012 | Anderson | G01C 15/04 455/456.3 |
| 2014/0040765 | A1* | 2/2014 | Fung | G09B 5/06 715/748 |

FOREIGN PATENT DOCUMENTS

| | | |
|---|---|---|
| CN | 101924916 A | 12/2010 |
| CN | 101980143 A | 2/2011 |

(Continued)

OTHER PUBLICATIONS

Korean Intellectual Property Office, International Search Report for International Application No. PCT/KR2014/009950, dated Jan. 26, 2015.

(Continued)

*Primary Examiner* — Sumaiya A Chowdhury
(74) *Attorney, Agent, or Firm* — Baker McKenzie; Hyunho Park

(57) ABSTRACT

A channel-based method and system for relaying contents are disclosed. The content relaying method generates a channel on the basis of a user terminal or a specific group adjacent to a display device and can relay, to the display device, a screen for executing the contents displayed on the user terminal when the user terminal accesses the generated channel.

15 Claims, 20 Drawing Sheets

(51) Int. Cl.
*G06Q 50/00* (2012.01)
*H04N 21/442* (2011.01)
*H04N 21/4788* (2011.01)
*H04N 21/41* (2011.01)
*H04N 21/4363* (2011.01)

(52) U.S. Cl.
CPC ......... *G06Q 50/01* (2013.01); *H04N 21/4122* (2013.01); *H04N 21/43637* (2013.01); *H04N 21/44204* (2013.01); *H04N 21/4788* (2013.01)

(56) References Cited

FOREIGN PATENT DOCUMENTS

| CN | 103324457 A | 9/2013 |
| JP | 2003-288286 A | 10/2003 |
| JP | 2005222305 A | 8/2005 |
| JP | 2009-526598 A | 2/2007 |
| JP | 2009-531770 A | 10/2007 |
| JP | 2009-000521 A | 1/2009 |
| KR | 10-2003-0014899 A | 2/2003 |
| KR | 10-2011-0036351 A | 4/2011 |
| KR | 10-2012-0028757 A | 3/2012 |
| KR | 10-1278606 B1 | 6/2013 |
| WO | 2013-157340 A1 | 10/2013 |

OTHER PUBLICATIONS

Korean Intellectual Property Office, Written Opinion for International Application No. PCT/KR2014/009950, dated Jan. 26, 2015.

\* cited by examiner

CHANNEL-BASED METHOD AND SYSTEM FOR RELAYING CONTENTS

TECHNICAL FIELD

Example embodiments relate to a channel-based content relay method and system, and more particularly, to a method and system that may control content to be displayed on a display device in response to a user connecting to a channel generated based on an area or a group and executing the content.

BACKGROUND ART

Users may play games with other users. In particular, with the distribution of a mobile terminal, such as a smartphone, a game play using the mobile terminal is on significant increase, whereas the number of platforms for playing games is insufficient.

In addition, users may desire to share contents with other users present at a desired (or, alternatively, predetermined) location. Examples of the contents may include photos, videos, music, and the like. However, in general, users may share contents by transmitting the contents through a wireless communication manner.

A large number of televisions (TVs) and the like are installed in various public places, such as a shopping mall, an airport, a subway station, a cafeteria, and the like. Further, in many cases, screens are installed on outer walls of buildings in a dense floating population area. Such TVs, screens, etc., are simply used to display preset broadcastings, advertisings, and the like.

However, users located around a TV, a screen, etc., installed at home, at an office, in a public place, or in a densely populated area, may visually share contents that attract interest of the users through a display. Thus, the TV, the screen, and the like, may be used a new business model.

DISCLOSURE OF INVENTION

Technical Goals

Example embodiments provide a method and system that may support a platform that enables users to participate in and compete for a specific event by relaying a content execution screen displayed on a user terminal to a display device installed in a public place.

Example embodiments also provide a method and system that may establish a new personal relationship based on a display device by providing a channel in which arbitrary users, not friends, gather and share contents through a single tool, such as the display device.

Example embodiments also provide a method and system that may expand a new market by providing various beneficial products separate from contents through a channel that associated with a display device.

Example embodiments also provide a method and system that may expand a business based on display of content since it is possible to enhance a content utilization opportunity through a display device.

Technical Solutions

According to an aspect of example embodiments, there is provided a content relay method performed at a channel operator terminal, the method including setting an option of a channel that associated with a display device relaying content executed at a user terminal; and generating a channel based on the option. The channel is connected with a user terminal present around the display device or connectible by a user terminal included in a specific group.

The channel may be set to the same network as a network connected with the display device.

The content relay method may further include selecting a user terminal for relaying the content through the display device from among a plurality of user terminals if the plurality of user terminals is connected to the channel.

The selecting of the user terminal may include selecting the user terminal based on channel connection priority, random priority, or arbitrary designation.

The option may include at least one of a channel name, an SSID (Service Set Identifier) of a network that associated with the channel, a connection password of the display device, a guide text to be displayed on the display device, a content name, a channel operator, or an area range set based on the network.

The display device may relay content of a user terminal selected from among a plurality of user terminals connected to the channel, and each of the plurality of user terminals may be a service subscriber provided from an application that associates an account with the content.

According to an aspect of example embodiments, there is provided a content relay method performed at a user terminal, the method including searching for a channel generated at a channel operator terminal; selecting a channel in order to connect to the searched channel; and executing content set to the channel through connection to the selected channel. The content is relayed through a display device that associated with the channel, and the channel is connected with a user terminal present around the display device or connectible by a user terminal included in a specific group.

The searching for the channel may include searching for a channel used for relaying the content through the display device if the user terminal is connected to a network specified at the channel and is present within a distance adjacent to an installation area of the display device that associated with the channel.

According to an aspect of example embodiments, there is provided a content relay method performed at a channel server, the method including providing a channel generated at a channel operator terminal in response to a channel search from a user terminal or a display device; and making a request for mirroring a content execution screen displayed on a user terminal selected by the channel operator terminal to be relayed through the display device.

The content relay method may further include updating execution results of content processed at the user terminal for each channel or each group.

The channel may be connected with a user terminal present around the display device or connectible by a user terminal included in a specific group.

According to an aspect of example embodiments, there is provided a content relay method performed at a display device including searching for a channel associated with a network connected with the display device; selecting a single channel from among channels found to enable sharing of a content execution screen displayed on a user terminal connected to the channel; and receiving and displaying a content execution screen displayed on a user terminal connected to the selected channel.

The channel may be connected with a user terminal present around the display device or connectible by a user terminal included in a specific group.

The channel may be set to the same network as a network connected with the display device.

According to an aspect of example embodiments, there is provided a channel operator terminal including a channel setter configured to set an option of a channel that associated with a display device relaying content executed at a user terminal; and a channel generator configured to generate a channel based on the option. The channel is connected with a user terminal present around the display device or connectible by a user terminal included in a specific group.

The channel may be set to the same network as a network connected with the display device.

The channel operator terminal may further include a terminal selector configured to select a user terminal for relaying content through the display device from among a plurality of user terminals if the plurality of user terminals is connected to the channel.

The terminal selector may select a user terminal based on channel connection priority, random priority, or arbitrary designation.

The option may include at least one of a channel name, an SSID of a network that associated with the channel, a connection password of the display device, a guide text to be displayed on the display device, a content name, a channel operator, or an area range set based on the network.

The display device may relay content of a user terminal selected from among a plurality of user terminals connected to the channel, and each of the plurality of user terminals may be a service subscriber provided from an application that associates an account with the content.

According to an aspect of example embodiments, there is provided a user terminal including a channel searcher configured to search for a channel generated at a channel operator terminal; a channel selector configured to select a channel in order to connect to the searched channel; and a content executor configured to execute content set to the channel through connection to the selected channel. The content is relayed through a display device that associated with the channel, and the channel is connected with a user terminal present around the display device or connectible by a user terminal included in a specific group.

The channel searcher may search for a channel used for relaying the content through the display device if the user terminal is connected to a network specified at the channel and is present within a distance adjacent to an installation area of the display device that associated with the channel.

According to an aspect of example embodiments, there is provided a channel server including a channel provider configured to provide a channel generated at a channel operator terminal in response to a channel search from a user terminal or a display device; and a content mirroring configured to make a request for mirroring a content execution screen displayed on a user terminal selected by the channel operator terminal to be relayed through the display device.

The channel server may further include a result updater configured to update execution results of content processed at the user terminal for each channel or each group.

The channel may be connected with a user terminal present around the display device or connectible by a user terminal included in a specific group.

According to an aspect of example embodiments, there is provided a display device including a channel searcher configured to search for a channel associated with a network connected with the display device; a channel selector configured to select a single channel from among channels found to enable sharing of a content execution screen displayed on a user terminal connected to the channel; and a content relay configured to receive and display a content execution screen displayed on a user terminal connected to the selected channel.

The channel may be connected with a user terminal present around the display device or connectible by a user terminal included in a specific group.

The channel may be set to the same network as a network connected with the display device.

Effects of the Invention

According to example embodiments, it is possible to provide a platform that enables users to participate in and compete for a specific event by relaying a content execution screen displayed on a user terminal to a display device.

Also, according to example embodiments, it is possible to establish a new personal relationship based on a display device by providing a channel in which arbitrary users, not friends, gather and share contents through a single tool, such as the display device.

Also, according to example embodiments, it is possible to expand a new market by providing various beneficial products separate from contents through a channel that associated with a display device.

Also, according to example embodiments, it is possible to expand a business based on display of content since it is possible to enhance a content utilization opportunity through a display device.

BEST MODE FOR CARRYING OUT THE INVENTION

Hereinafter, example embodiments will be described with reference to the accompanying drawings.

Figure 1:
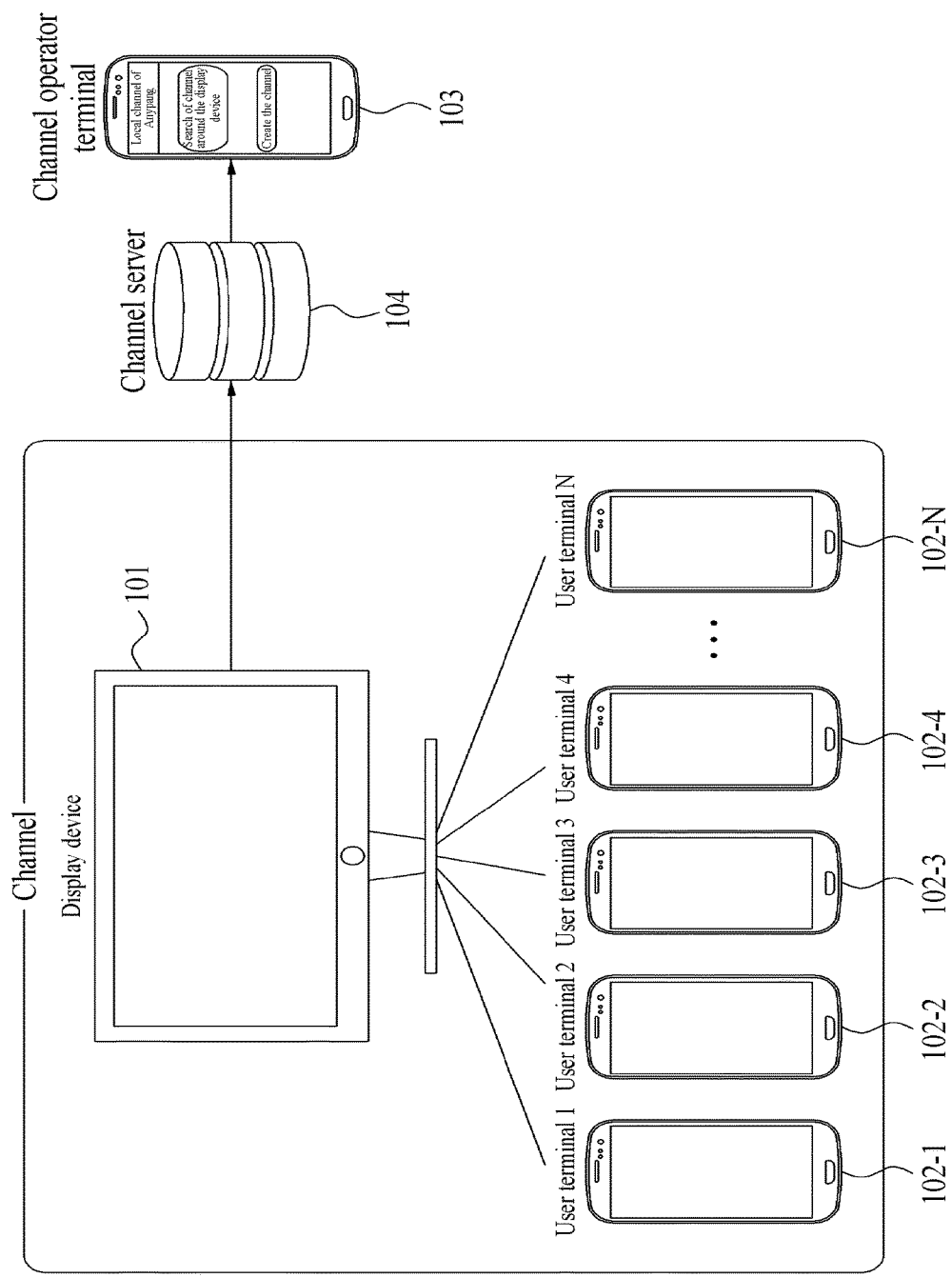
FIG. 1 illustrates a process of relaying content based on a channel according to an example embodiment.

FIG. 1 illustrates a process of relaying content based on a channel according to an example embodiment.

Referring to FIG. 1, a display device 101 and a plurality of user terminals 102-1 through 102-N may configure a channel. The channel may be generated at a channel operator terminal 103. The display device 101 may broadcast a content execution screen of each of the plurality of user terminals 102-1 through 102-N. The channel operator terminal 103 may generate the channel and may control a content execution screen that is to be displayed through the display device 101. Each of the plurality of user terminals 102-1 through 102-N may execute content. Hereinafter, an owner of the channel operator terminal 103 is represented as a channel operator and an owner of a user terminal is represented as a user.

In FIG. 1, the channel operator terminal 103 may control the display device 101 and may group the plurality of user terminals 102-1 through 102-N present around the display device 101 based on a single piece of content. The channel operator terminal 103 may provide a channel that is a space in which the user terminals 102-1 through 102-N may share the content through the display device 101 regardless of that the user terminals 102-1 through 102-N are in friend relationship or not in friend relationship. Although FIG. 1 illustrates the channel operator terminal 103 as a separate constituent element, an operation of the channel operator terminal 103 may be applicable to the display device 101 and a content server for executing the content.

For example, the channel may indicate a network space in which the user terminals 102-1 through 102-N set based on a desired (or, alternatively, predetermined) standard may share the content through the display device 101. The channel may be generated at the channel operator terminal 103 or may be generated at a channel server 104. The channels generated at the channel operator terminal 103 and the channel server 104 may be provided through the channel server 104. Each of the user terminals 102-1 to 102-N may share a content execution screen displayed on its terminal through the display device 101 by connecting to the channel set to the channel server 104.

Here, the term "share/sharing" may indicate that the user terminals 102-1 through 102-N may verify a content execution status since a content execution screen displayed on each of the user terminals 102-1 through 102-N is displayed on the display device 101.

For example, the content execution screen may be displayed on the display device 101 using a variety of methods, such as mirroring, streaming, wired connection, and the like. In detail, when the channel server 104 or the channel operator terminal 103 transfers a mirroring target to the user terminals 102-1 through 102-N and the display device 101, the corresponding content execution screen of each of the user terminals 102-1 through 102-N may be mirrored at the display device 101 dynamically during an execution of the content corresponding to the mirroring target.

Also, when the channel server 104 or the channel operator terminal 103 transfers a mirroring target to the user terminals 102-1 through 102-N and the display device 101, the corresponding content execution screen of each of the user terminals 102-1 through 102-N may be streamed to the display device 101 dynamically during an execution of the content corresponding to the mirroring target.

Also, when the user terminals 102-1 through 102-N are physically connected to the display device 101 through a cable and content is executed at each of the user terminals 102-1 through 102-N, the corresponding execution screen of each of the user terminals 102-1 through 102-N may be transferred to the display device 101 through the cable.

The desired (or, alternatively, predetermined) standard may include an installation area of the display device 101, a specific group, etc. Users of the plurality of user terminals 102-1 through 102-N may be or may not be in friend relationship. For example, the users of the plurality of user terminals 102-1 through 102-N may be subscribers of a preset application. For example, the same messenger application may be installed in the plurality of user terminals 102-1 through 102-N, and the users of the plurality of user terminals 102-1 through 102-N may have joined the messenger application. That is, content shared through the display device 101 may associate an account with a messenger, a social network service (SNS), etc. In this case, users of the plurality of user terminals 102-1 through 102-N may be or may not be in friend relationship or acquaintance relationship in association with the messenger, the SNS, etc.

The channel operator terminal 103 may generate a channel so that the users may share contents being executed at the plurality of user terminals 102-1 through 102-N through the display device 101. Also, the channel operator terminal 103 may search for a connectible channel around the display device 101 and may provide the found connectible channel to the plurality of user terminals 102-1 through 102-N.

The channel operator terminal 103 may exist separate from the display device 101, such as a mobile phone, a set-top box, and the like. Alternatively, the channel operator terminal 103 may be included in the display device 101 or may be the display device 101.

For example, when the channel operator terminal 103 is a mobile phone, the channel operator terminal 103 may display a content execution screen of each of the plurality of user terminals 102-1 through 102-N on the display device 101. When the channel operator terminal 103 is included in the set-top box or the display device 101, the channel operator terminal 103 may display a content execution screen of each of at least one of the plurality of user terminals 102-1 through 102-N on the display device 101 using streaming through the channel server 104.

The channel operator terminal 103 enables contents being executed at the plurality of user terminals 102-1 through 102-N to be displayed on the display device 101 and thereby shared. For mirroring, the channel operator terminal 103 may select a user terminal for executing content to be shared through the display device 101 among the contents executed at the plurality of user terminals 102-1 through 102-N, and may manage the selected user terminal.

During an execution of content at a user terminal to which a priority is assigned based on an internal criterion or a request from the plurality of user terminals 102-1 through 102-N, the channel operator terminal 103 may enable a user terminal corresponding to subsequent order to be in a standby state for executing content. Meanwhile, when a function of the channel operator terminal 103 is included in the display device 101, the display device 101 may search for and display a content-related channel that is generated around the display device 101.

For example, if a game is played at each of the plurality of user terminals 102-1 through 102-N, a game execution screen may be displayed on the display device 101. The users of the plurality of user terminals 102-1 through 102-N may view the game execution screen displayed on the display device 101. Here, the game execution screen may be one that is executed on at least one of the plurality of user terminals 102-1 through 102-N.

According to example embodiments, it is possible to provide a channel in which arbitrary users, not friends, may gather and enjoy content such as a game. Here, the users may execute a game through a specific channel based on the display device 101. Users playing game through a channel associated with the display device 101 may compete with each other for game scores. The users may be present in the same area or may belong to the same group. That is, according to example embodiments, it is possible to provide a channel capable of executing content, and to support a platform that enables users to participate in the channel and to compete with each other through the content.

The owner of the channel operator terminal 103 and the owner of the display device 101 may be identical. Alternatively, the channel operator terminal 103 may be one of the plurality of user terminals 102-1 through 102-N.

The display device 101 may refer to a device that may display content execution screens of the user terminals 102-1 through 102-N over a wired or wireless network. That is, the display device 101 may be provided in any type capable of displaying a content execution screen. For example, the display device 101 may include a television (TV), a back screen, a monitor, a mobile phone, a tablet personal computer (PC), and the like. In particular, the display device 101 may include a TV, a screen, and the like, installed in a public place, such as a place, for example, a shopping mall, a department store, a city hall square, an airport, a train station, a subway station, a cafeteria, and the like, where many people are present.

According to example embodiments, there is provided a platform that enables users to share content executed at each of other user terminals 102-1 through 102-N through the display device 101, such as a TV, a screen, and the like. The user terminals 102-1 through 102-N and the channel operator terminal 103 may include a mobile terminal, such as a mobile phone, a smartphone, a tablet PC, and the like, which enables a network.

FIGS. 2 through 16 will be described based on an example in which content is a game. However, the content is not limited to the game and any type of contents may be applicable.

Figure 2:
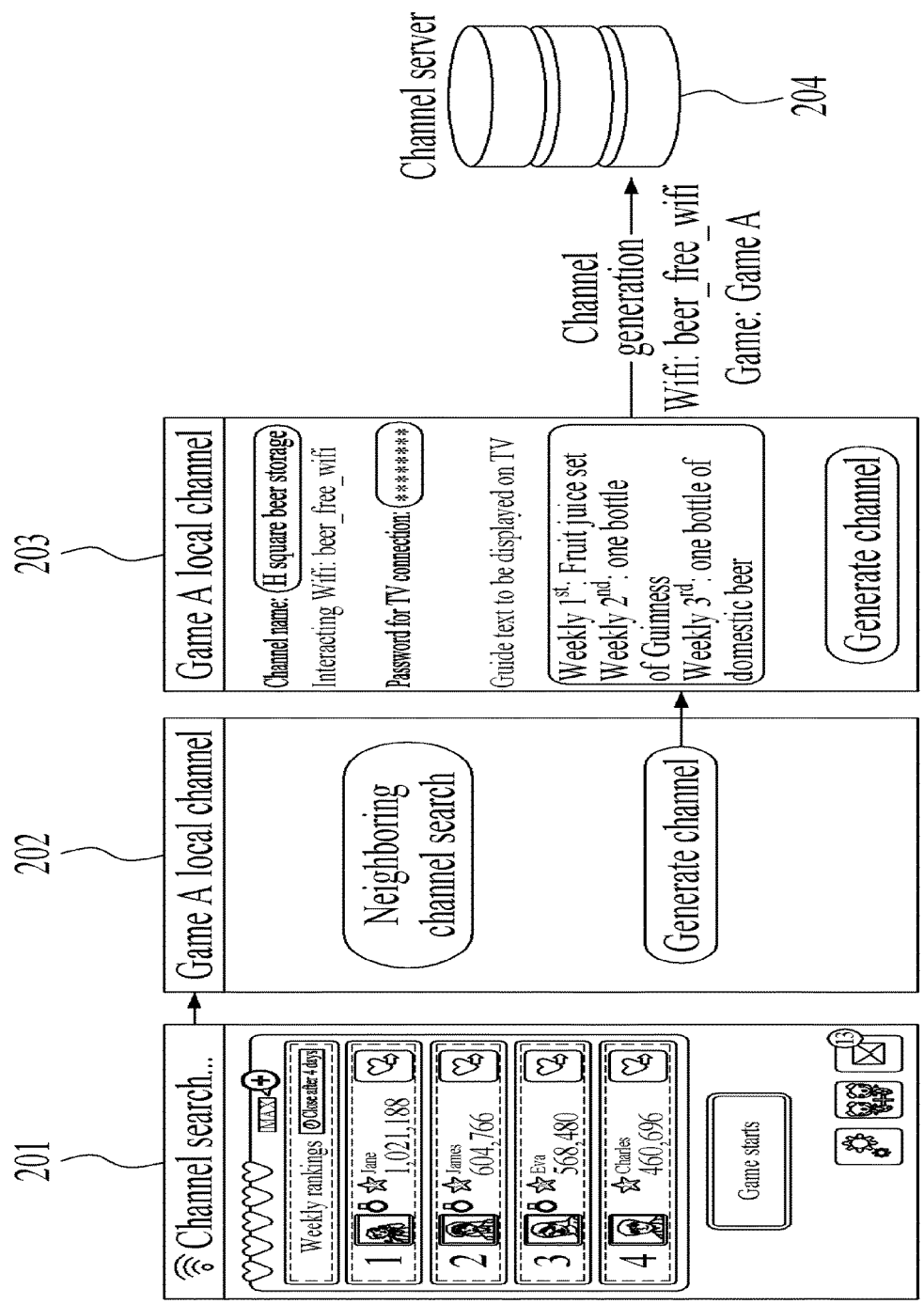
FIG. 2 illustrates a process of generating a channel according to an example embodiment.

FIG. 2 illustrates a process of generating a channel according to an example embodiment.

According to an example embodiment, a channel may be generated through an application program interface (API) provided at content, such as a movie, a game, and the like. The API may indicate an interface provided at the content to generate a channel. Referring to a screen 201 of FIG. 2, an identifier, for example, a channel bar capable of searching for a channel on a content execution screen displayed on a channel operator terminal may be displayed. Referring to a screen 202, an interface, such as "search for a peripheral channel" or "generate a channel", may be displayed. Here, "search for a peripheral channel" may indicate an interface for searching for channels generated at channel operator terminals and "generate a channel" may indicate an interface for generating a new channel.

Referring to a screen 203, a variety of option information used for a channel operator terminal to generate a channel may be displayed. The channel operator terminal may generate a channel based on an installation area of a display device or a group. The channel operator terminal may set a channel name, an SSID of a network that associated with the channel, a connection password of the display device, a guide text to be displayed on the display device, and the like.

The channel may be identified based on a type of content, an SSID of a network, a channel name, and the like. When a user terminal is connected to a network through an SSID (beer_free_wifi in FIG. 2) of the network that associated with the channel, the user terminal may search for a generated channel and may connect to the searched channel. The channel generated at the channel operator terminal may be found through a channel server 204. At least one channel may be generated at a single display device. A single channel operator terminal may be connected to a single channel.

Figure 3:
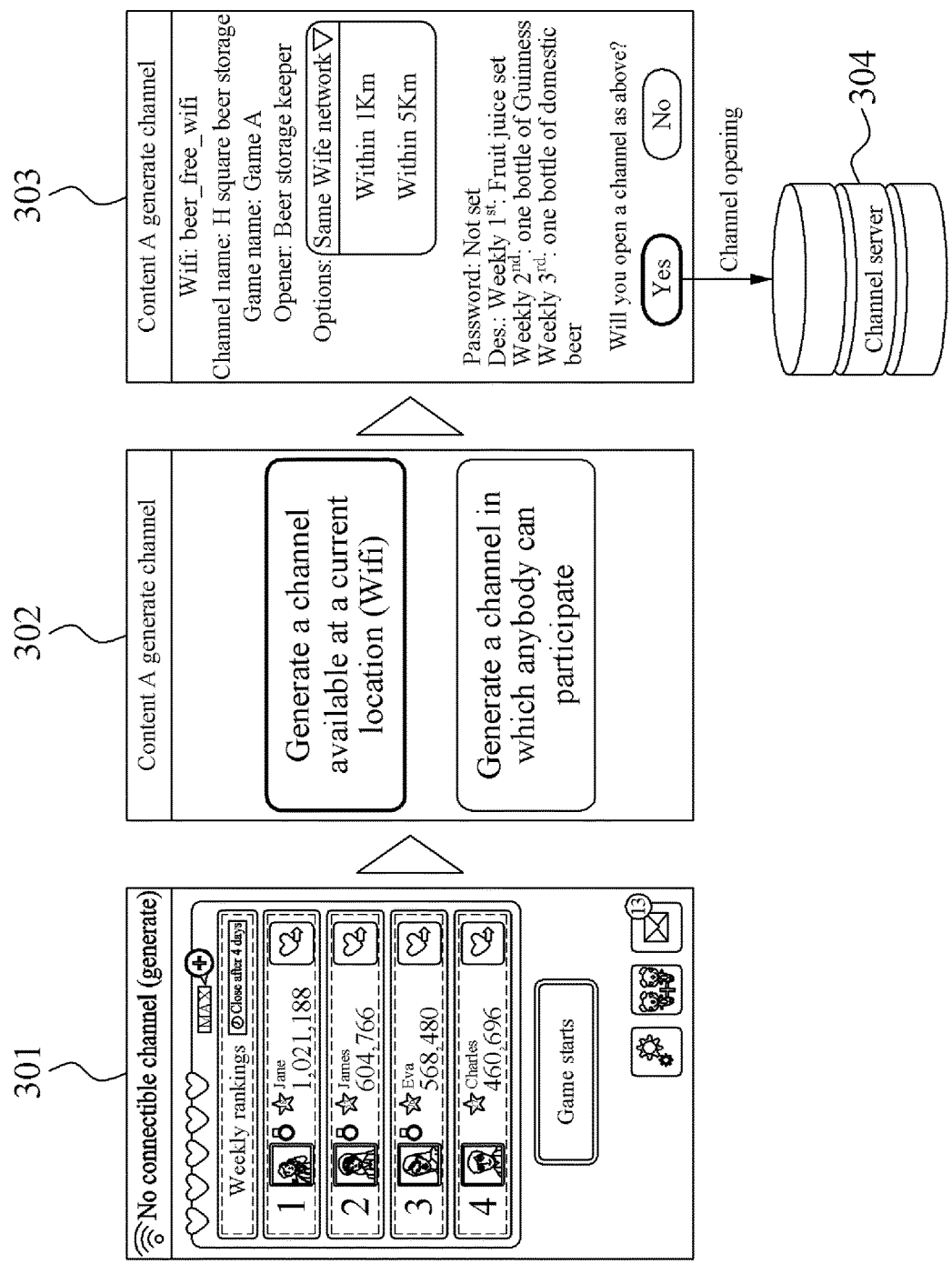
FIG. 3 illustrates a process of generating a channel by setting an option according to an example embodiment.

FIG. 3 illustrates a process of generating a channel by setting an option according to an example embodiment.

According to an example embodiment, a channel may be generated through an API provided at content. That is, although the content is being used, a separate link capable of generating a channel may be indicated on the content. A channel operator terminal may generate the channel based on an installation area of a display device or a group.

A screen 301 of FIG. 3 shows an example in which a channel connectible in a specific network is absent around the channel operator terminal. Referring to a screen 302, an identifier (a button, etc.,) for connecting to a page associated with a channel generation may be displayed on a content execution screen. Here, the channel operator terminal may limit or may not limit a condition of a user terminal connectible to the channel based on the network.

For example, the channel operator terminal may set an SSID of wireless fidelity (WiFi) set by the channel operator terminal, a media access control (MAC) address of WiFi, or combination thereof as a channel connection condition of the user terminal. In addition, the channel operator terminal is an ID, an authentication key, a password, and the like, of near field radio communication for a user terminal present around the display device as the channel connection condition of the user terminal.

Referring to a screen 303, the channel operator terminal may generate a channel by setting a channel name, an SSID of a network that associated with the channel, a connection password of the display device, a guide text, for example, a gift, an advertisement, an event, etc., to be displayed on the display device, and the like. A MAC address of the network may be set in association with the network.

In addition, the channel operator terminal may generate the channel by setting a content name, a channel operator, an area range set based on the network, and the like. Here, the area range may be set from a location at which the channel is generated to a preset radius.

For example, user terminals present within a distance predetermined from a location at which a channel is generated may participate in the channel. In this case, a location of a user terminal may be identified based on a global positioning system (GPS), a location of a mobile communication base station associated with the user terminal, a location of a WiFi access point (AP) connected with the user terminal, and the like.

The area range may be set from a location at which a channel is generated around the display device to a location connectible at preset data reception sensitivity or more. Alternatively, the area range may be set to include a place in which the display device is installed or neighboring areas present within a radius preset from the place in which the display device is installed.

A channel may be identified based on a type of content, identification information, for example, an SSID, a MAC address, etc., of a network for channel connection, a channel name, and the like. When a user terminal is connected to a network, the user terminal may search for a generated channel and may connect to the searched channel. A channel generated at the channel operator terminal may be found through a channel server 304. At least one channel may be generated with respect to a single display device. A single channel operator terminal may be connected to a single channel.

Figure 4:
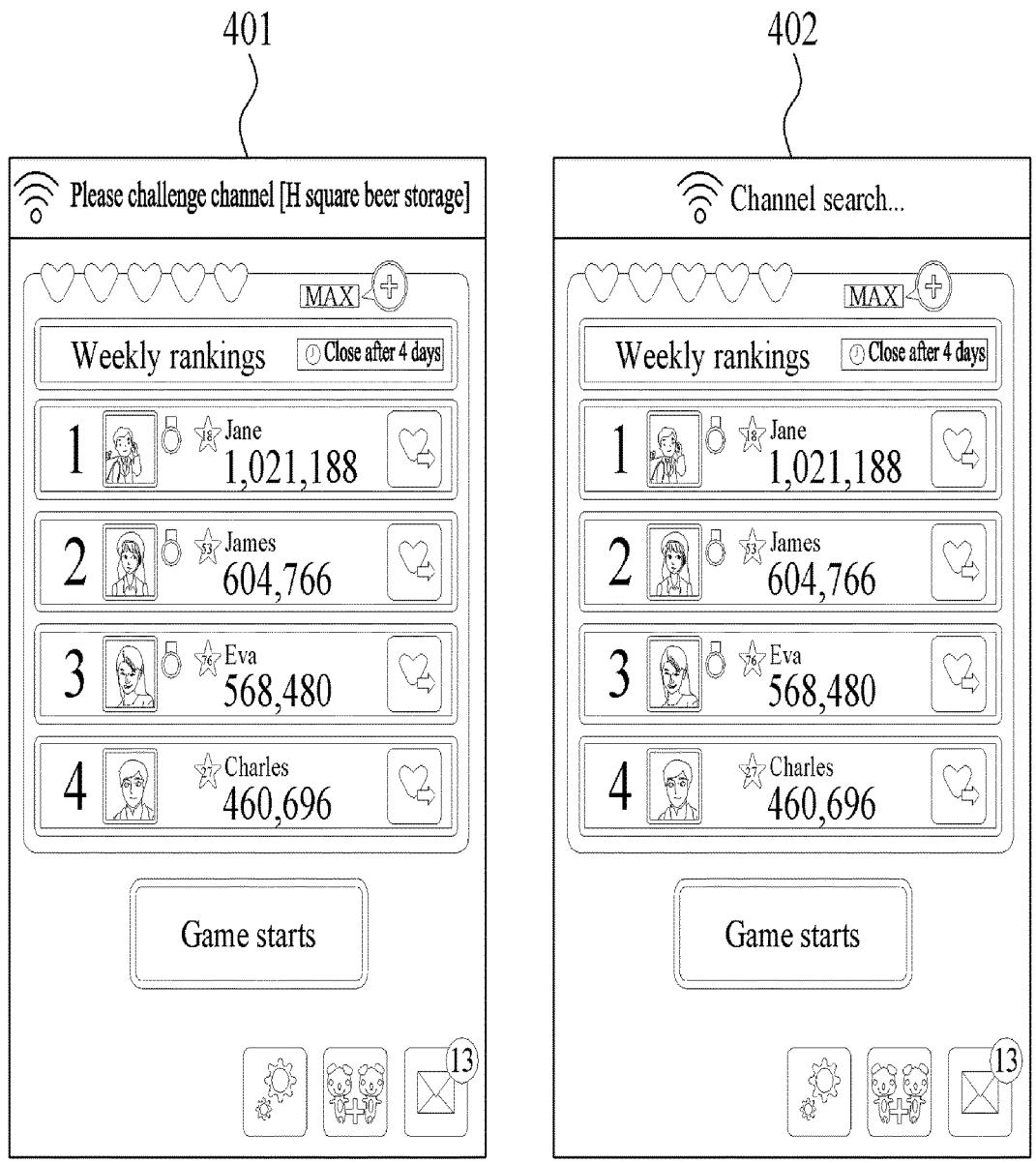
FIG. 4 illustrates a process of displaying a channel on content being executed or searching for a channel according to an example embodiment.

FIG. 4 illustrates a process of displaying a channel on content being executed or searching for a channel according to an example embodiment.

Referring to a screen 401 and a screen 402 of FIG. 4, a separate status box for verifying and selecting a channel may be included in a content execution screen displayed on a user terminal. The screen 401 shows an example in which a channel "H square beer storage" is generated around the user terminal and the user terminal is connected to a network identified for the channel.

Alternatively, referring to the screen 402, a separate status box for searching for a channel generated around the user terminal may be included in the content execution screen displayed on the user terminal.

That is, an API that configures a status box for verifying and selecting a channel generated around the user terminal may be provided. The status box may be provided at a desired (or, alternatively, predetermined) location of the content execution screen.

Figure 5:
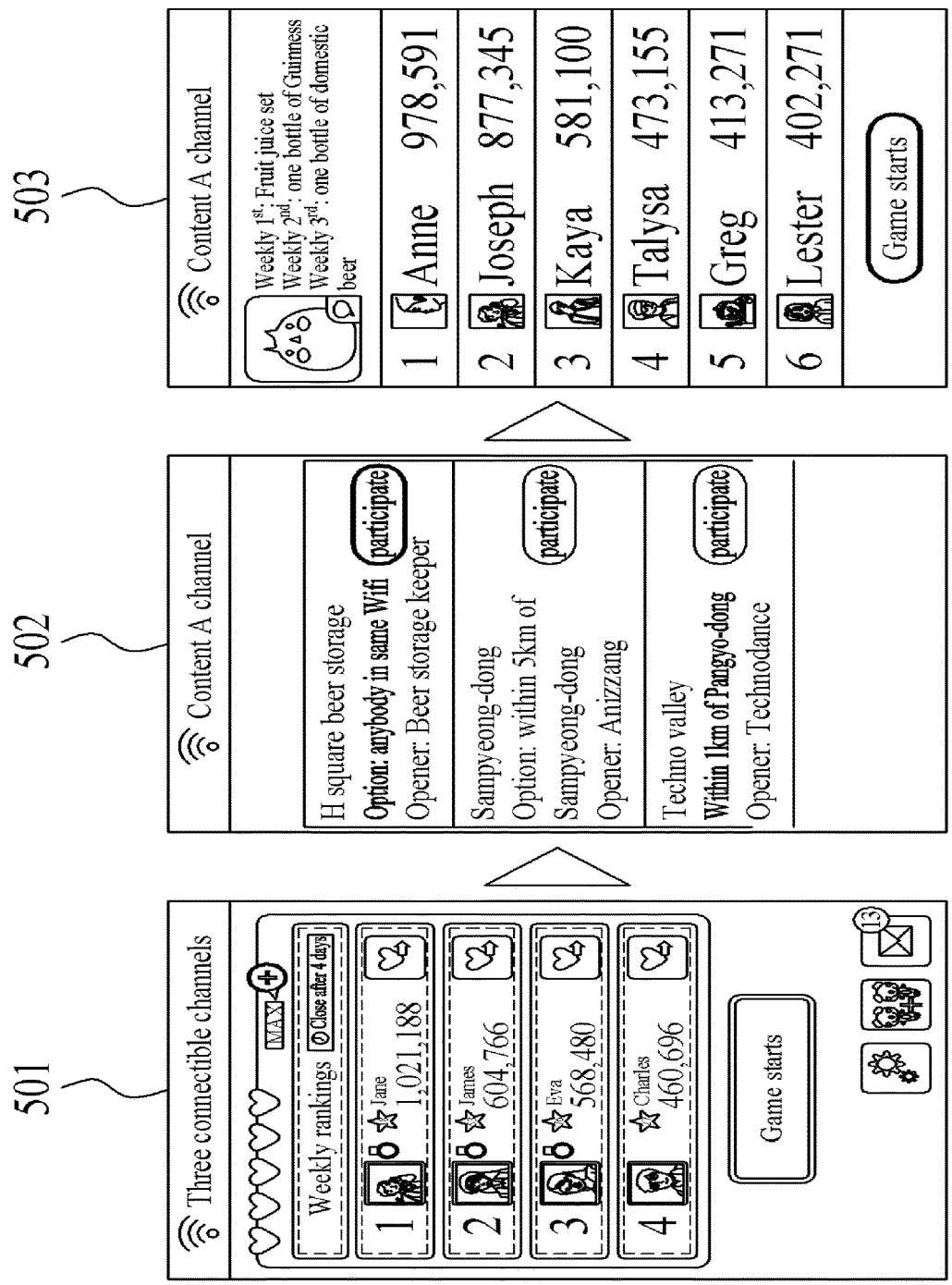
FIG. 5 illustrates a process in which a user terminal connects to a generated channel according to an example embodiment.

FIG. 5 illustrates a process in which a user terminal connects to a generated channel according to an example embodiment.

Referring to a screen 501 of FIG. 5, if a channel available through a network to which a user terminal is currently connected is present, at least one currently available channel may be displayed on a content execution screen.

Here, the channel indicates a channel associated with an area in which the user terminal is currently present or a group to which a user belongs. For example, if the user is at restaurant A, a channel capable of sharing content through a display device installed in the restaurant A may be generated. Here, the content sharable through the display device may be executed at each of user terminals present within a distance preset from the display device installed in the restaurant A.

Alternatively, if the user belongs to school B, a channel capable of sharing content through the display device may be generated. Here, the content sharable through the display device may be executed at each of user terminals of the user that belongs to the school B.

Referring to a screen 502, a list of channels available through a network to which the user terminal is currently connected may be displayed. The user terminal may connect to one of the channels included in the list. The screen 502 shows an example in which the user terminal is connected to a channel with the name of "H square beer storage".

Referring to a screen 503, a channel participant list of user terminals having visited the channel "H square beer storage" may be displayed. Here, users included in the channel participant list may be in friend relationship or may belong to the same group. Alternatively, users included in the channel participant list may have history of having shared content through the same display device although they are not in friend relationship. The users of the channel participant list may be subscribers of the same application. That is, content to be shared through the display device may associate an account with a messenger, an SNS, and the like. In this case, users of a plurality of user terminals may be or may not be in friend relationship or acquaintance relationship in association with a messenger, an SNS, and the like.

Referring to the screen 503, if content is a game, the channel participant list may include a name, a ranking, scores, etc, of a user that plays the game. An identifier ("game starts") used for the user terminal to execute the content may be displayed on the screen 503.

Figure 6:
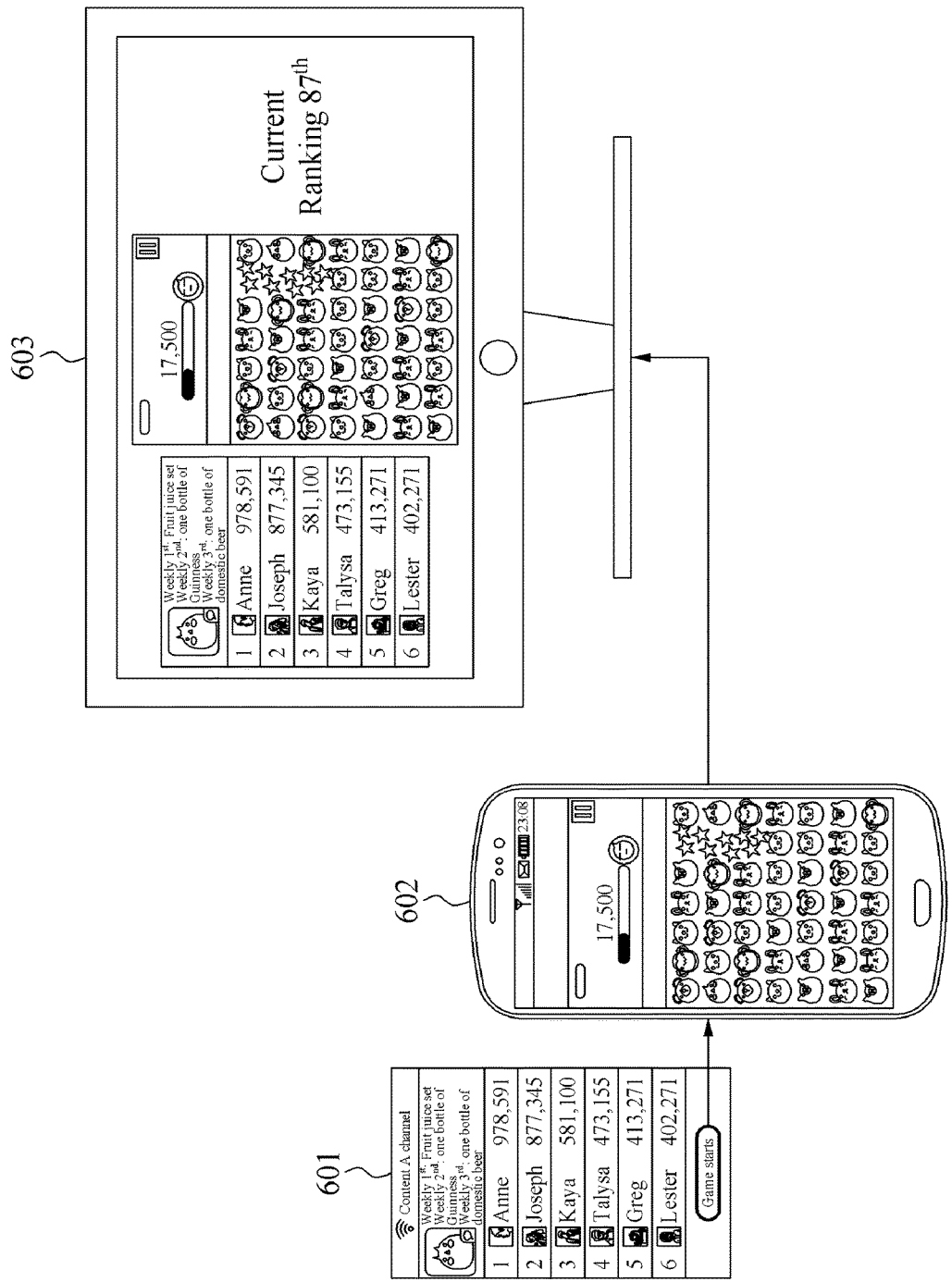
FIG. 6 illustrates a process of sharing content executed by a user through a display device according to an example embodiment.

FIG. 6 illustrates a process of sharing content executed by a user through a display device according to an example embodiment.

Similar to the screen 503, an identifier used for a user terminal to execute content may be displayed on a screen 601. Here, in response to the user terminal selecting the identifier and executing the content, the content may be executed on a screen 602. A content execution screen displayed on the user terminal using a variety of display methods may be displayed as is on a display screen 603. For example, the variety of display methods may include mirroring, streaming, wired connection, and the like. The content execution screen displayed on the user terminal may be shared with other users through the display device.

That is, since content being executed at a specific user terminal is displayed on a display device such as a TV, a monitor, a mobile phone, a tablet PC, and a screen, an execution status of the content may be shared with other users present around the display device.

Figure 7:
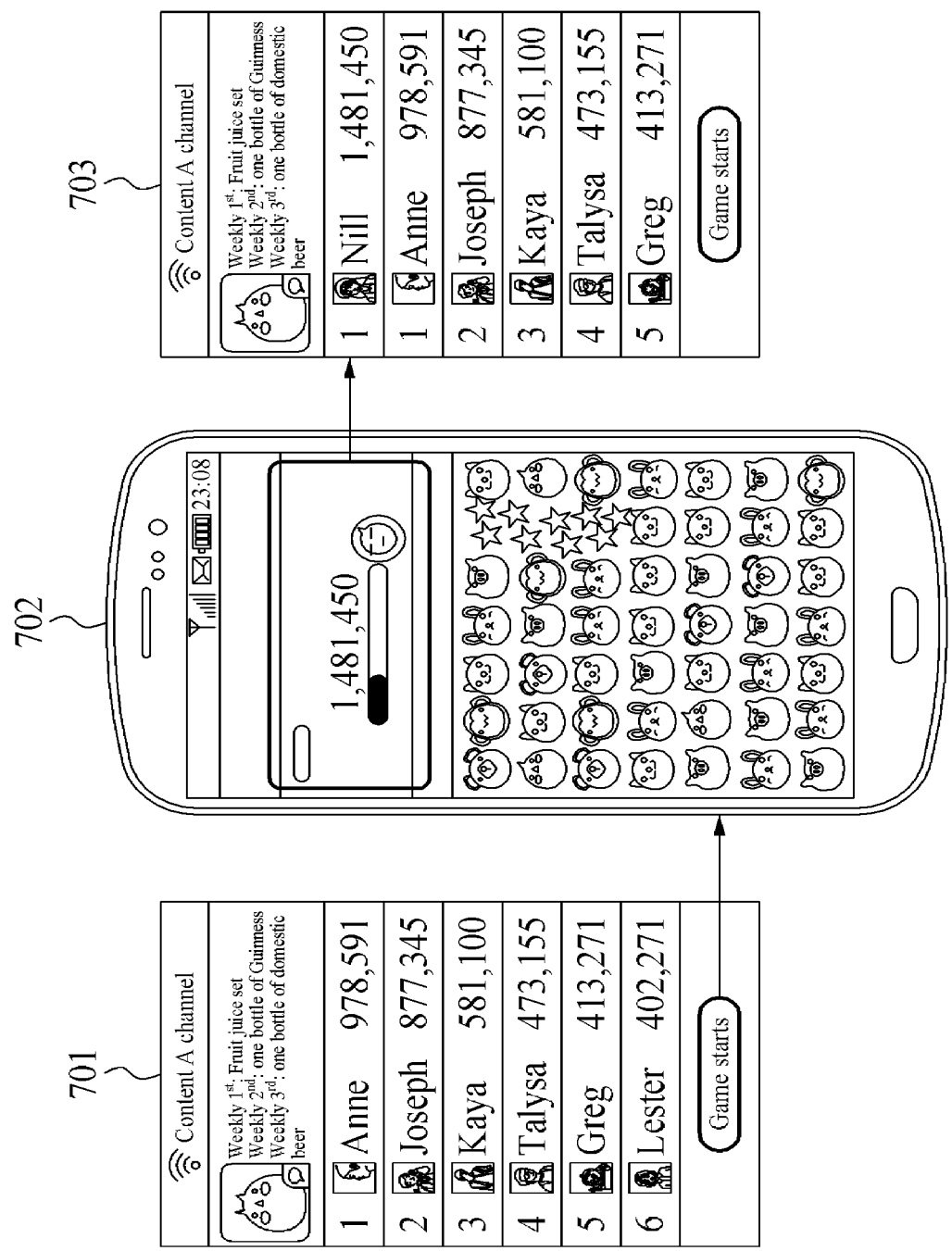
FIG. 7 illustrates a process of comparing execution results of content shared through a specific channel according to an example embodiment.

FIG. 7 illustrates a process of comparing execution results of content shared through a specific channel according to an example embodiment.

A channel participant list of user terminals having shared content through a specific channel may be displayed on a screen 701. Also, a content execution button for sharing the content may be displayed on the screen 701. If the content is executed and terminated at the user terminal as shown on a screen 702, final results of the content executed at the user terminal may be updated to the channel participant list as shown on a screen 703. The channel participant list may be recorded on a channel server that associated with the channel. If the content is executed and terminated at the user terminal connected to the channel, updating may be continued.

The content execution results may induce a user to participate in a channel that associated with a display device and to compete with another user.

Figure 8:
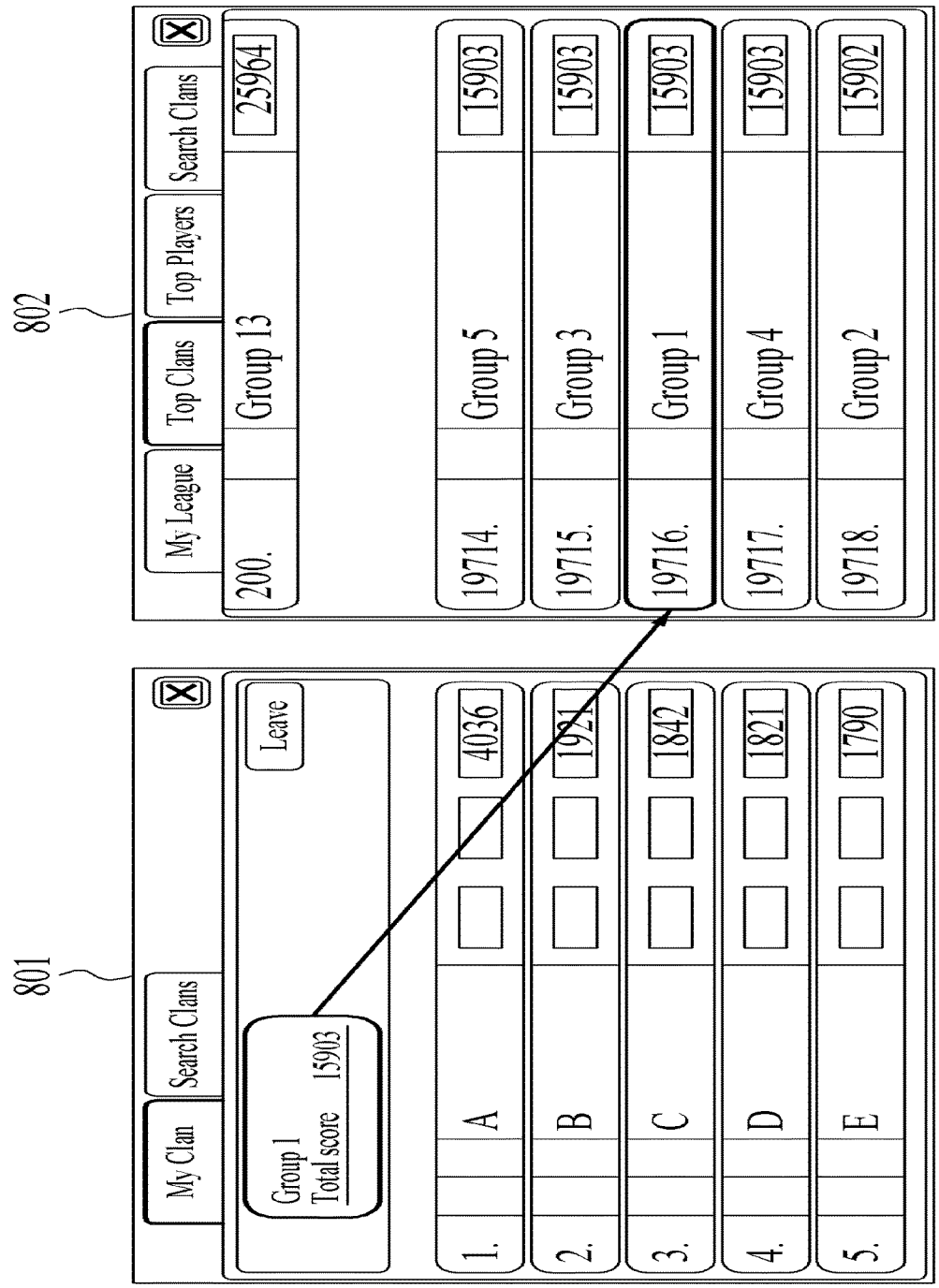
FIG. 8 illustrates an example of a reader board of a channel-by-channel group according to an example embodiment.

FIG. 8 illustrates an example of a reader board of a channel-by-channel group according to an example embodiment.

According to an example embodiment, execution results of content executed at a user terminal may be differently determined for each channel. For example, content execution results by the user terminal that connects to a first channel that associated with a first display device installed in a place A may differ from content execution results by the user terminal that connects to a second channel that associated with a second display device installed in a place B. In addition, the content execution results by the user terminal that connects to the first channel that associated with the first display device installed in the place A may differ from content execution results by the user terminal that connects to the second channel that associated with the second display device installed in the place A.

That is, the content execution results may be identified for each channel. Accordingly, the channel-by-channel content execution results may be provided. The content execution results provided for each channel may be represented using a channel-by-channel reader board. A reader board displays content execution results by user terminals participating in a channel based on a ranking. The channel-by-channel reader board may be classified into a group-by-group reader board.

A screen 801 shows an example of content execution results of each of group members included in a group A displayed on a first channel. A screen 802 shows an example of results of adding up execution results of the group members included in the group A among a plurality of groups. Here, a group is referred as a clan.

According to an example embodiment, it is possible to induce a user participating in a channel to execute content by providing content execution results for each channel and/or each group.

Figure 9:
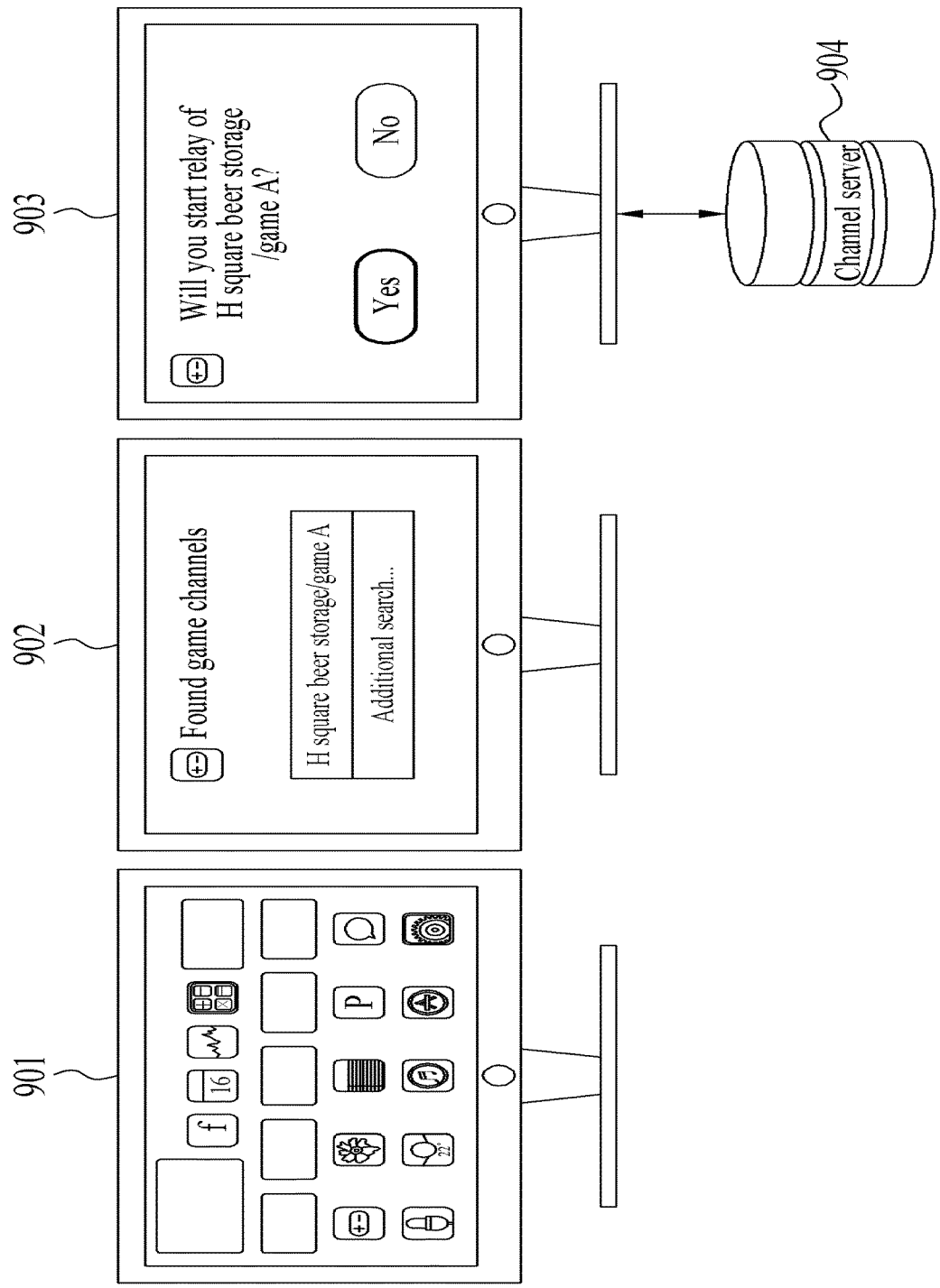
FIG. 9 illustrates a process of designating a relay channel by searching for a channel in a display device according to an example embodiment.

FIG. 9 illustrates a process of designating a relay channel by searching for a channel in a display device according to an example embodiment.

Referring to FIG. 9, a screen 901 shows a process of executing an application installed in a display device to search for a channel. The display device may perform communication over a wired or wireless network. A variety of applications may be installed in the display device.

A screen 902 shows search results of channels associated with a network connected with the display device after executing the application. Here, a network set to a channel and the network connected with the display device may be the same.

A screen 903 shows a process of selecting a channel found to relay content being executed at a user terminal that participates in the channel. In response to selecting the channel, the display device may display a content execution screen of the user terminal that participates in the channel to be relayed in association with a channel server 904.

Figure 10:
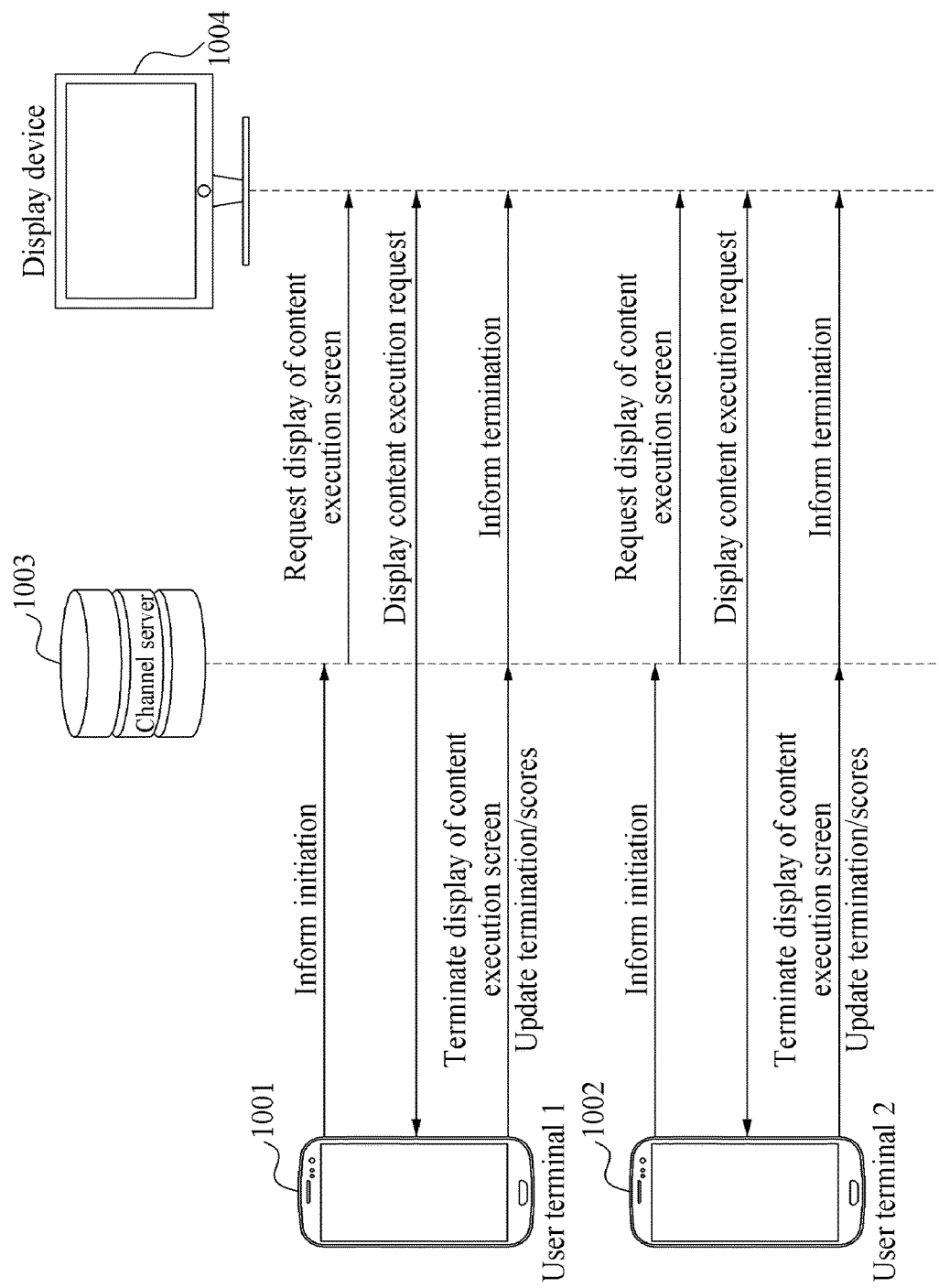
FIG. 10 illustrates a process of relaying a content execution screen displayed on a designated user terminal through a display device according to an example embodiment.

FIG. 10 illustrates a process of relaying a content execution screen displayed on a designated user terminal through a display device according to an example embodiment.

FIG. 10 illustrates a process of displaying a content execution screen displayed on a first user terminal 1001 and a second user terminal 1002 on a display device 1004. Here, a channel server 1003 may select a user terminal to be displayed on the display device 1004.

Here, it is assumed that the channel server 1003 displays the content execution screen being displayed on the first user terminal 1001. The first user terminal 1001 may inform the channel server 1003 that execution of content is initiated. The channel server 1003 may request the display device 1004 to display content associated with the first user terminal 1001. If the display device 1004 accepts the request, the content execution screen being displayed on the first user terminal 1001 may be displayed on the display device 1004. If execution of the content is terminated, the first user terminal 1001 may terminate displaying of the content and may request the channel server 1003 to update content execution results. The channel server 1003 may inform the display device 1004 that the content execution of the first user terminal 1001 is terminated.

If the content execution of the first user terminal 1001 is terminated, the channel server 1003 may designate a user terminal of which a content execution screen is to be displayed after the first user terminal 1001. In FIG. 10, the second user terminal 1002 is designated after the first user terminal 1001. A process of displaying a content execution screen of the second user terminal 1002 on the display device 1004 is the same as the process of displaying the content execution screen of the first user terminal 1001 on the display device 1004.

Figure 11:
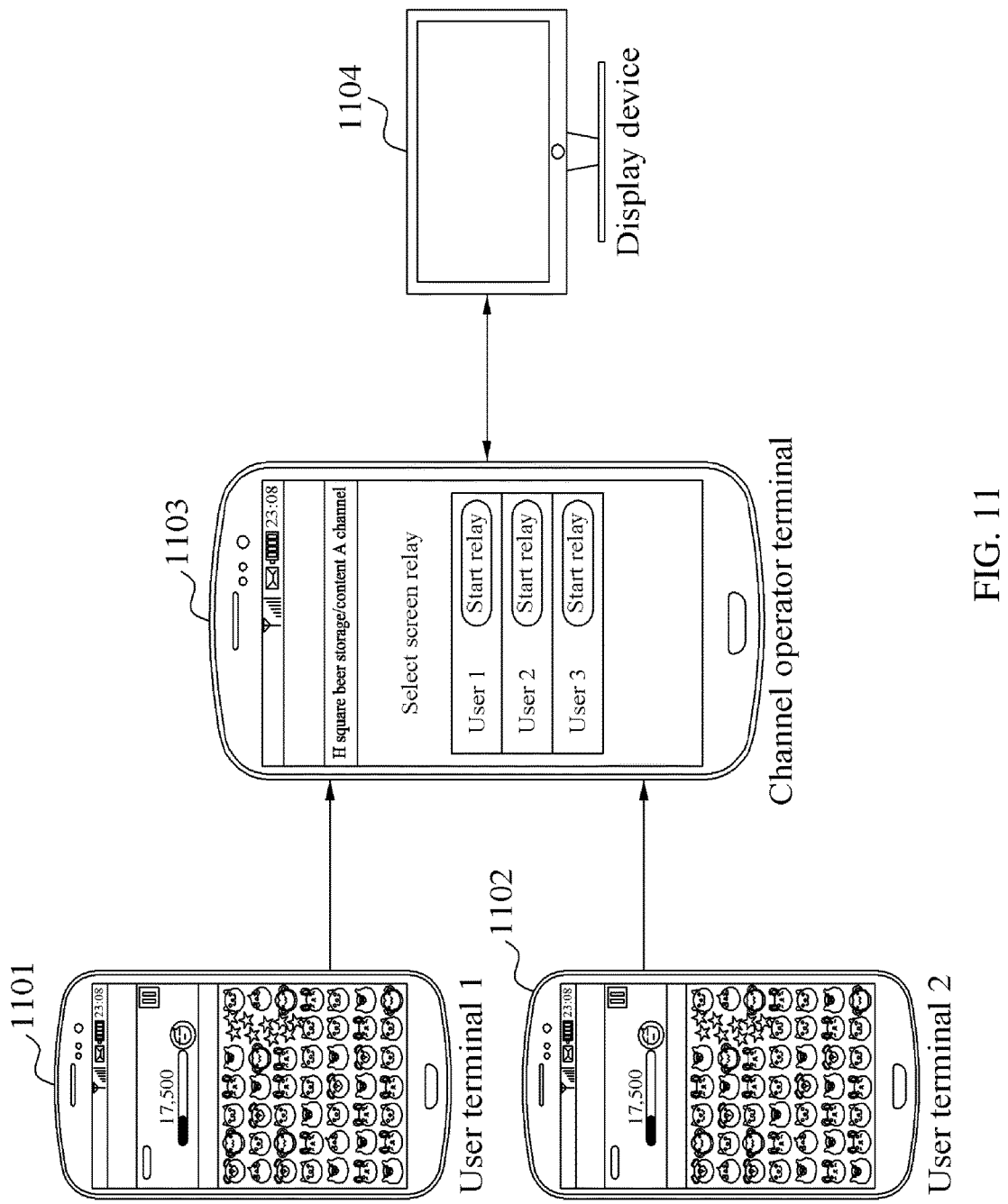
FIG. 11 illustrates a process of transferring content execution screens displayed on all of user terminals to a display device through a channel operator terminal according to an example embodiment.

FIG. 11 illustrates a process of transferring content execution screens displayed on all of user terminals to a display device through a channel operator terminal according to an example embodiment.

Referring to FIG. 11, each of a first user terminal 1101 and a second user terminal 1102 connected to a channel may transfer a content execution screen to a channel operator terminal 1103. That is, content execution screens being displayed on all of the user terminals participating in the channel may be transferred to the channel operator terminal 1103.

A content execution screen displayed on the channel operator terminal 1103 may be transmitted to and displayed on the display device 1104. Here, the channel operator terminal 1103 may transfer, to the display device 1104, a content execution screen being displayed on one of the user terminals that participate in the channel.

That is, the channel operator terminal 1103 may select a user terminal to be relayed through the display device 1104 from among the user terminals that participate in the channel, instead of substantially executing content. That is, the channel operator terminal 1103 may transfer content execution screens being displayed on the respective user terminals that participate in the channel to the display device 1104 by switching the content execution screens using an interface.

Figure 12:
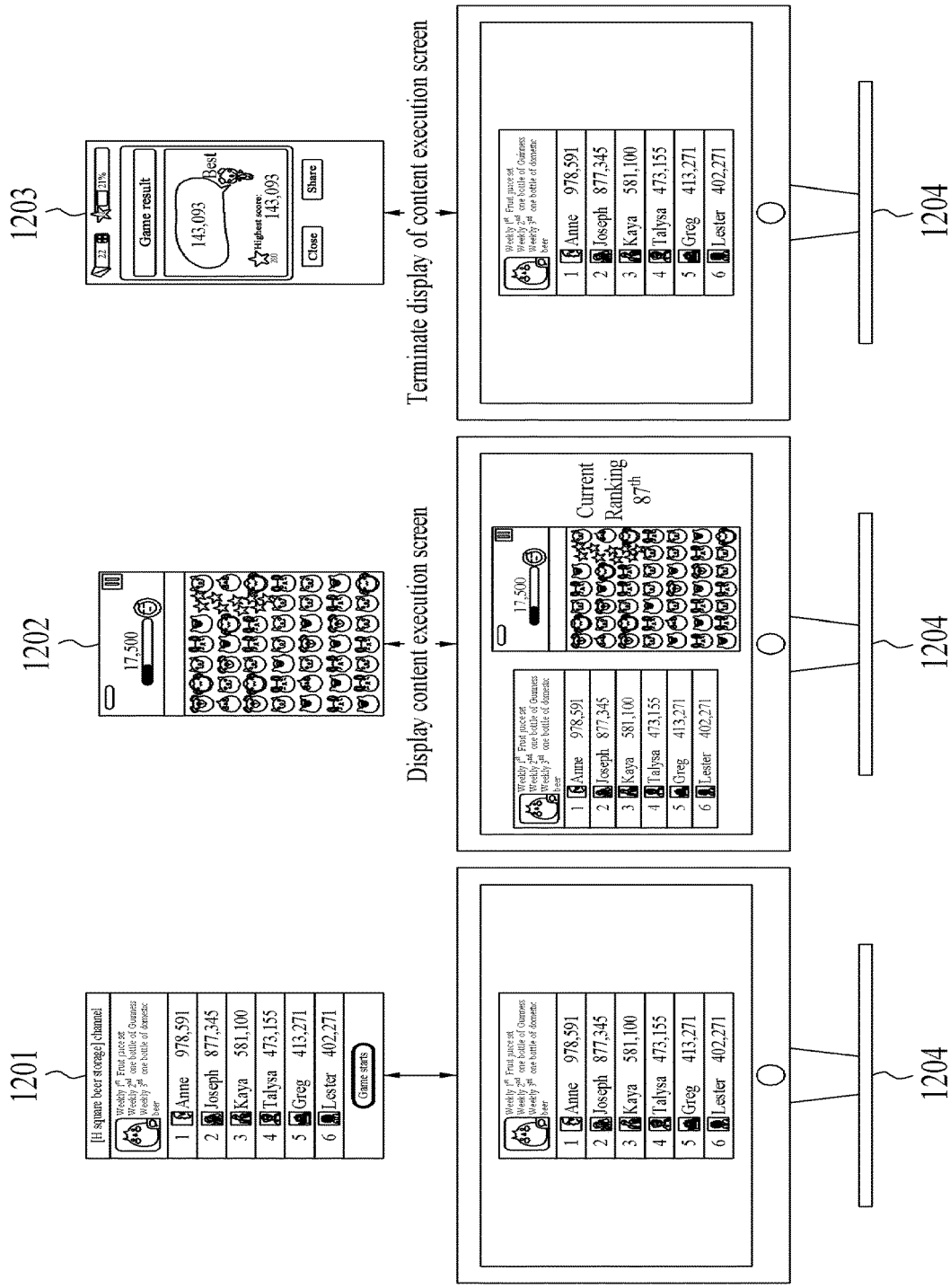
FIG. 12 illustrates a display device before execution of content, a display device during execution of the content, and a display device after execution of the content according to an example embodiment.

FIG. 12 illustrates a display device before execution of content, a display device during execution of the content, and a display device after execution of the content according to an example embodiment.

A screen 1201 of FIG. 12 shows an example before executing content, a screen 1202 shows an example in which the content is being displayed, and a screen 1203 shows an example in which the content is terminated.

Before execution of the content, a reader board of a channel connected with a user terminal may be displayed on a display device 1204. During execution of the content, the reader board and a content execution screen displayed on the user terminal may be displayed on the display device 1204. If the execution of the content is terminated, content execution results of the user terminal may be updated to the reader board. The updated reader board may be displayed on the display device 1204.

The processes of FIG. 12 assume that the display device 1204 and the user terminal are connected to the same network. Alternatively, although the display device 1204 and the user terminal are connected to respective networks, a channel operator terminal may log in and be paired to the display device 1204. The processes of FIG. 12 may be applicable to this example.

Figure 13:
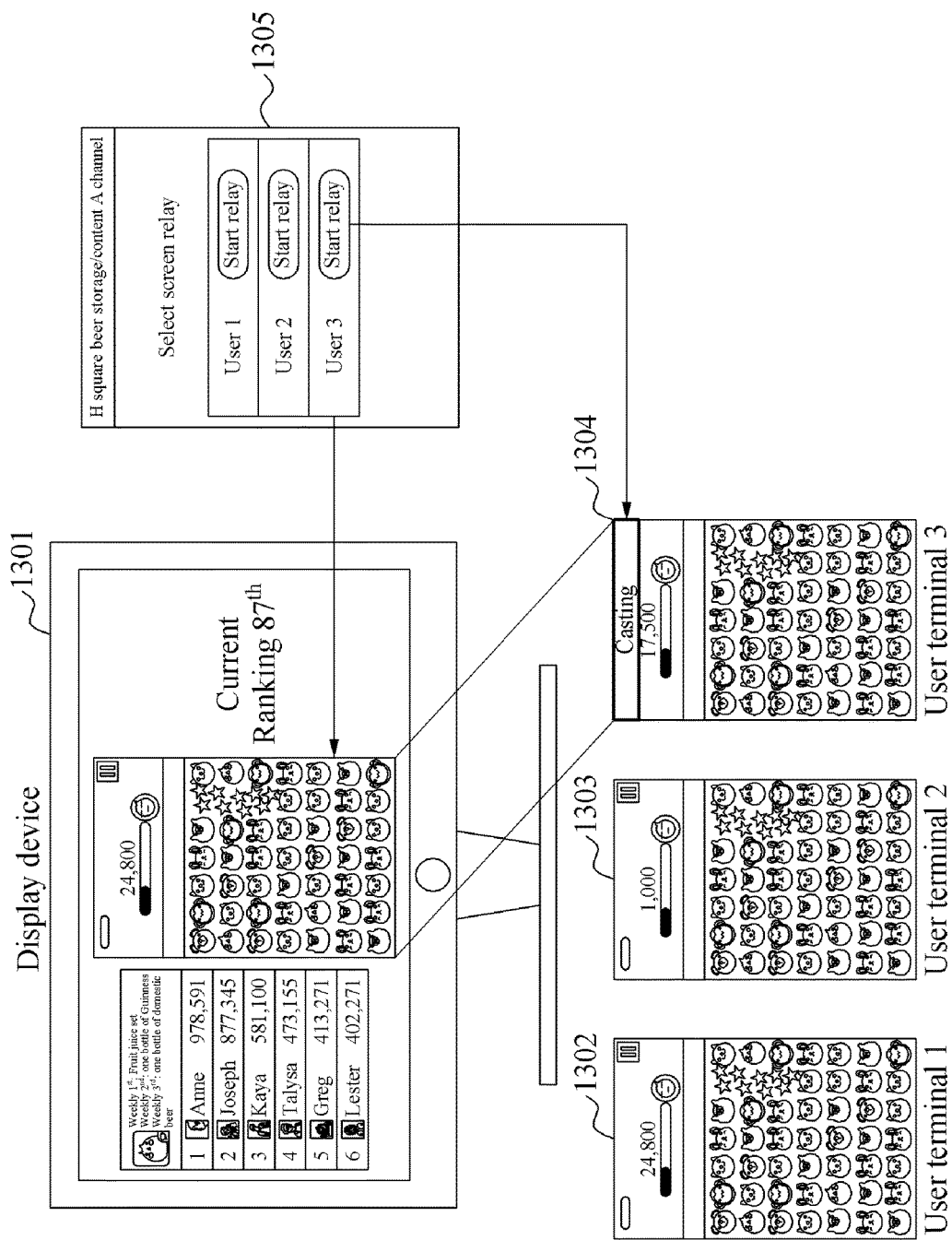
FIG. 13 illustrates a process of sharing a content execution screen displayed on a user terminal designated at a channel operator terminal according to an example embodiment.

FIG. 13 illustrates a process of sharing a content execution screen displayed on a user terminal designated at a channel operator terminal according to an example embodiment.

In detail, FIG. 13 illustrates an example in which the channel operator terminal selects a single user terminal from among a plurality of user terminals in response to the plurality of user terminals connected to a single channel. That is, if the plurality of user terminals executes content through the channel, the channel operator terminal may select a user terminal of which a content execution screen is to be relayed to the display device and be shared.

Referring to FIG. 13, for example, it is assumed that a first user terminal 1302, a second user terminal 1303, and a third user terminal 1304 are connected to the channel. Here, the first user terminal 1302, the second user terminal 1303, and the third user terminal 1304 may be displayed on a channel operator terminal 1305. In response to the channel operator terminal 1305 selecting the third user terminal 1304, a display device 1301 may display the content execution screen displayed on the third user terminal 1304 through relay.

If a plurality of user terminals executes content through simultaneous connection to a single channel, a channel operator terminal may select a single user terminal to be relayed to a display device from among the plurality of user terminals.

Figure 14:
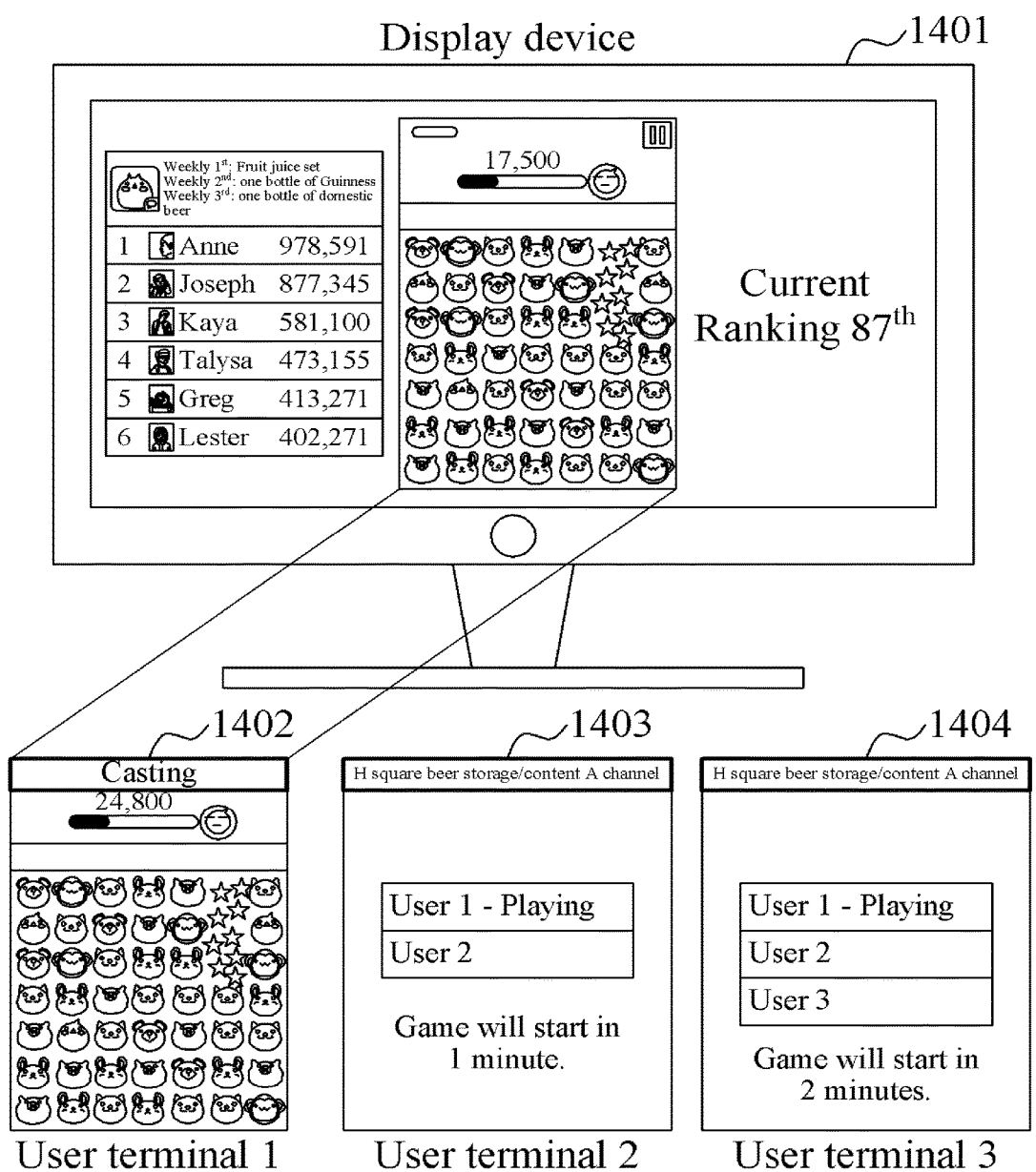
FIG. 14 illustrates a process of sharing a content execution screen displayed on a user terminal in channel connection order according to an example embodiment.

FIG. 14 illustrates a process of sharing a content execution screen displayed on a user terminal in channel connection order according to an example embodiment.

In FIG. 14, it is assumed that a plurality of user terminals is sequentially connected to a single channel. For example, a first user terminal 1402 is initially connected to the channel and then, a second user terminal 1403 and a third user terminal 1404 are subsequently connected to the channel. Regardless of a current state of a channel operator terminal, a content execution screen displayed on the first user terminal 1402 may be relayed to a display device 1401 based on channel connection order that indicates order in which the first user terminal 1401 is connected to the channel.

The second user terminal 1403 may be in a standby state until the content is terminated at the first user terminal 1402 or by a preset time. Likewise, the third user terminal 1404 may be in a standby state until the content is terminated at each of the first user terminal 1402 and the second user terminal 1403, or by the preset time.

If a channel operator is during his/her absence, a content execution screen displayed on a user terminal may be displayed on a display device in order in which a user terminal is relatively initially connected to a channel.

Figure 15:
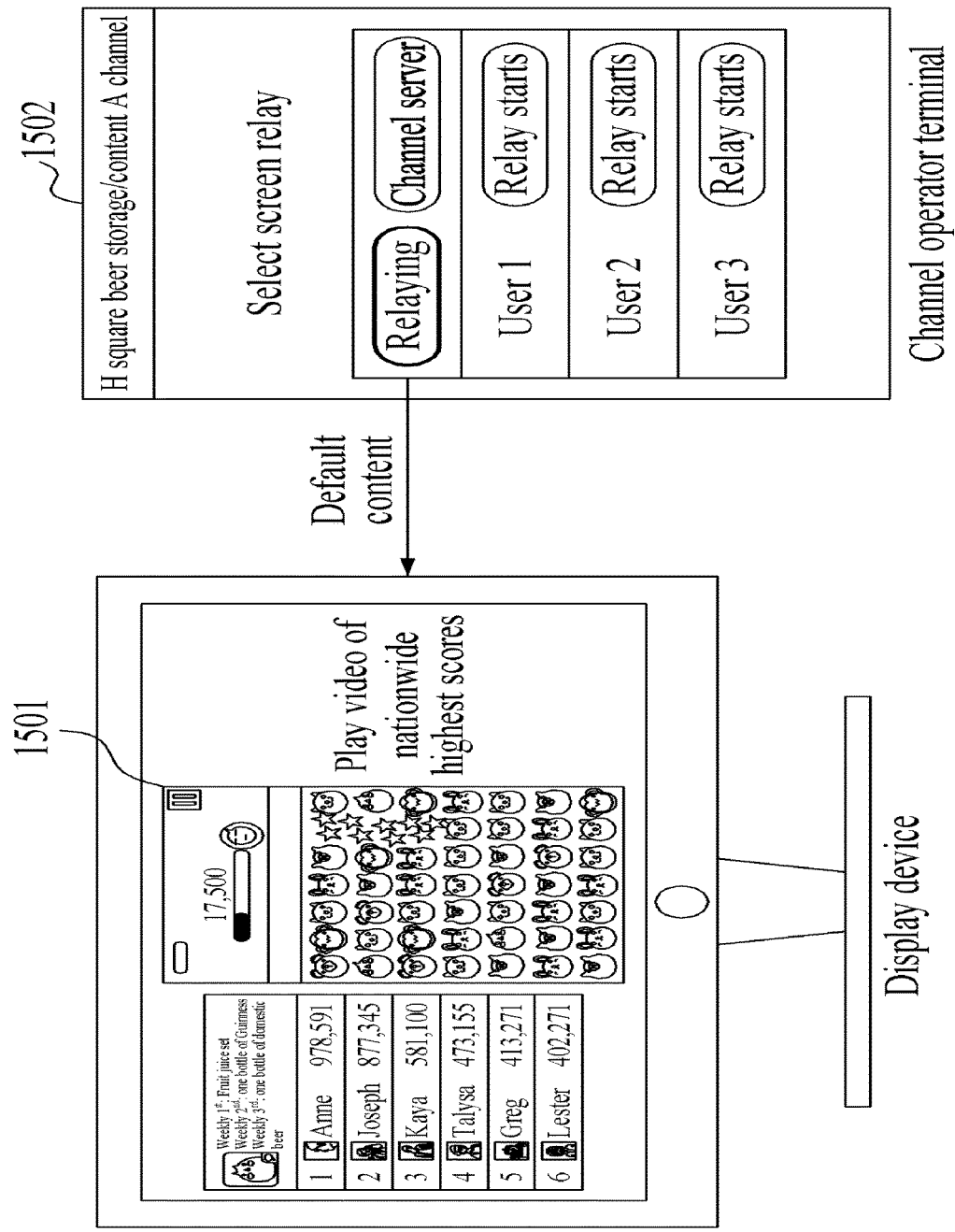
FIG. 15 illustrates a process of sharing a content execution screen provided from a control server according to an example embodiment.

FIG. 15 illustrates a process of sharing a content execution screen provided from a control server according to an example embodiment.

Referring to FIG. 15, a channel server as well as a list of user terminals may be included in a relay list. For example, if no user terminal is connected to a channel, a channel operator terminal 1502 may transfer a default content execution screen, for example, a play video of nationwide highest scores in FIG. 15, of the channel server to a display device 1501.

Alternatively, although a user terminal is connected to the channel, the channel operator terminal 1502 may transfer the default content execution screen of the channel server to the display device 1501 during a preset period of time before displaying a content execution screen of the user terminal or after execution of content is terminated. Here, if the channel operator terminal 1502 selects the channel server over the user terminal, the default content execution screen, for example, a play video of nationwide highest scores in FIG. 15, preset at the channel server may be transferred to and relayed at the display device 1501.

That is, the channel server may transfer default content to the display devices 1501 distributed over the nation. Depending on cases, the channel server may directly control the display device 1501 so that the channel server may generate a default content execution screen in a desired format, such as an event, an advertisement, and the like, and may relay the generated default content execution screen through the display device 1501.

Figure 16:
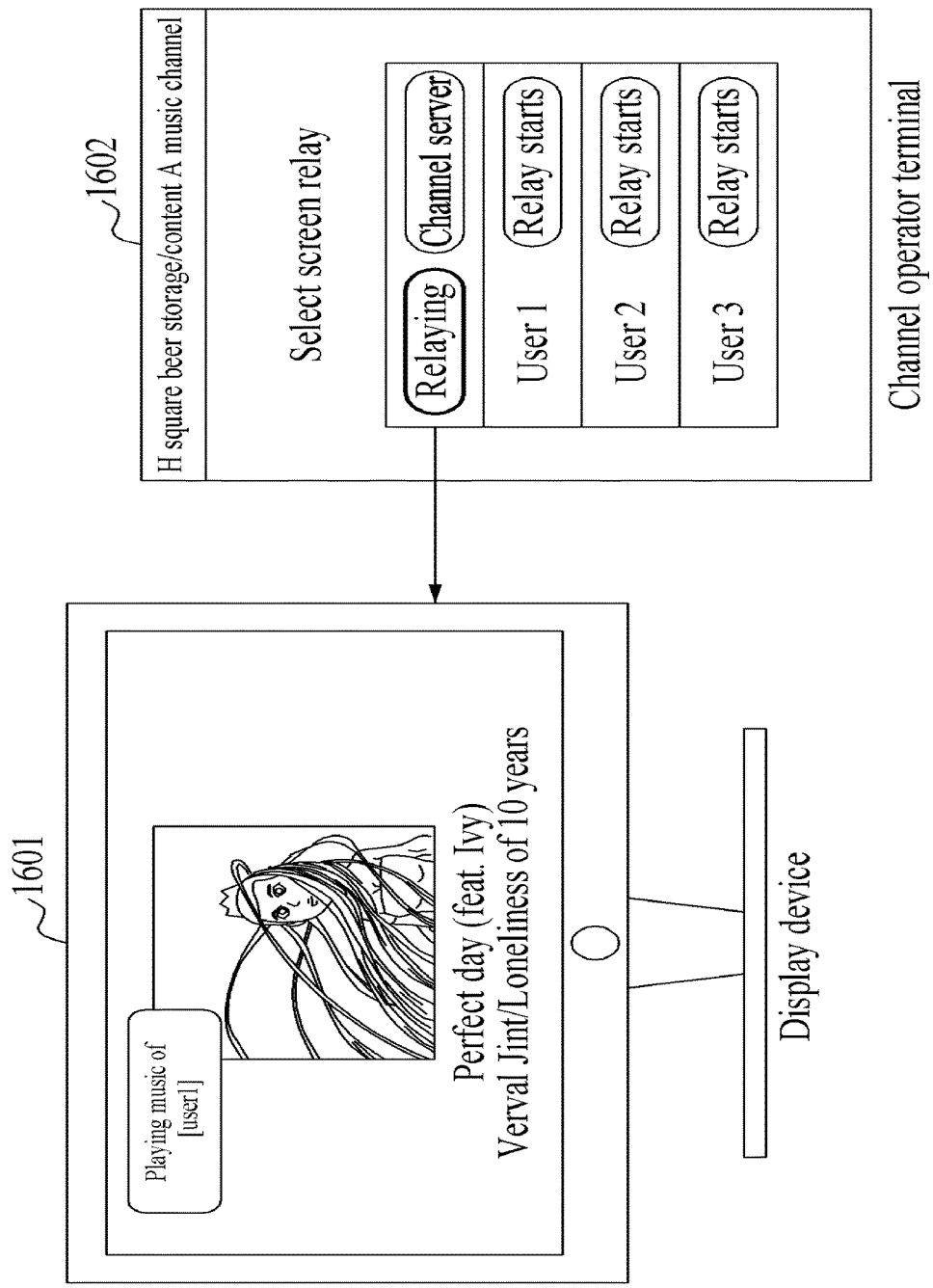
FIG. 16 illustrates a process of sharing a content execution screen in various types according to an example embodiment.

FIG. 16 illustrates a process of sharing a content execution screen in various types according to an example embodiment.

FIGS. 2 through 15 illustrate examples in which content is a game, whereas FIG. 16 illustrates an example in which content is music. According to an example embodiment, it is possible to transfer and relay a content execution screen provided from a user terminal or a channel server to a display device regardless of a type of content.

Referring to FIG. 16, a channel server as well as a list of user terminals may be included in a relay list. For example, if no user terminal is connected to a channel, a channel operator terminal 1602 may transfer a default content execution screen, for example, music titled 'perfect day' in FIG. 16, of the channel server to a display device 1601.

Alternatively, although a user terminal is connected to the channel, the channel operator terminal 1602 may transfer the default content execution screen of the channel server to the display device 1601 during a preset period of time before displaying a content execution screen of the user terminal or after execution of content is terminated. Here, if the channel operator terminal 1602 selects the channel server over the user terminal, the default content execution screen, for example, music titled 'perfect day' in FIG. 16, preset at the channel server may be transferred to and relayed at the display device 1601.

Figure 17:
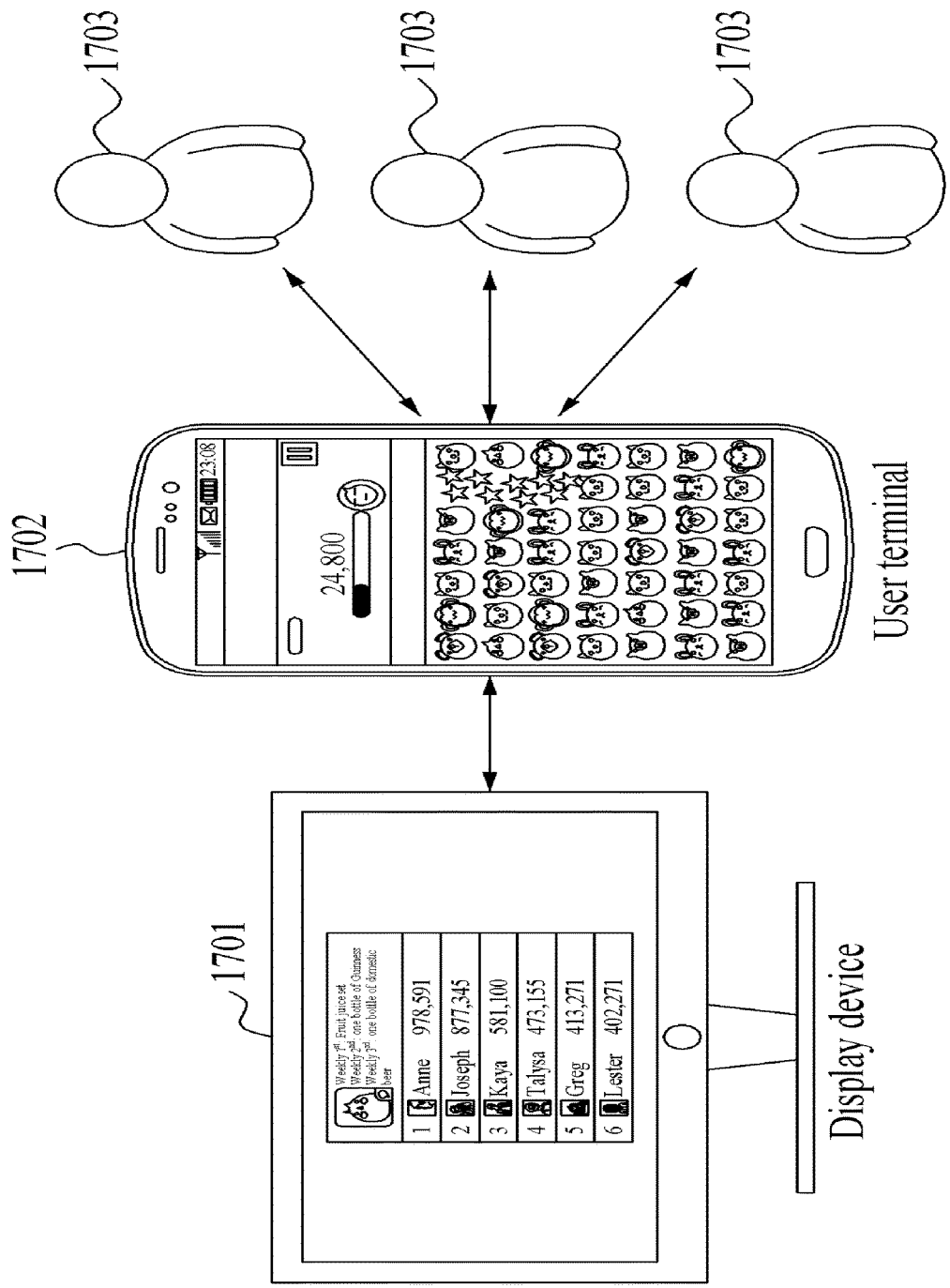
FIG. 17 illustrates a temporary login function according to an example embodiment.

FIG. 17 illustrates a temporary login function according to an example embodiment.

A temporary login indicates that other users 1703, not a user of a user terminal 1702, execute content in a state in which the user terminal 1702 is connected to a channel associated with a display device 1701.

That is, the temporary login may indicate that, in a circumstance in which the user terminal 1702 that performs mirroring or streaming through the channel associated with the display device 1701 is present, the users 1703 temporarily log in content being relayed from the user terminal 1702 to the display device 1701 through "one lick" using their own user terminals.

For example, a first user may easily log in a game of a second user being currently connected to a display device and may use content by selecting an interface displayed on a user terminal of the first user while viewing the game being relayed through the display device installed in a public place. That is, the temporary login indicates that the first user logs in the user terminal of the first user and uses the content using a user terminal of the second user instead of logging in and using the content with the user terminal of the first user.

The temporary login may be one-time performed or may be iteratively performed if a desired (or, alternatively, predetermined) condition is satisfied. The channel server may charge a user having performed the temporary login per temporary login.

Figure 18:
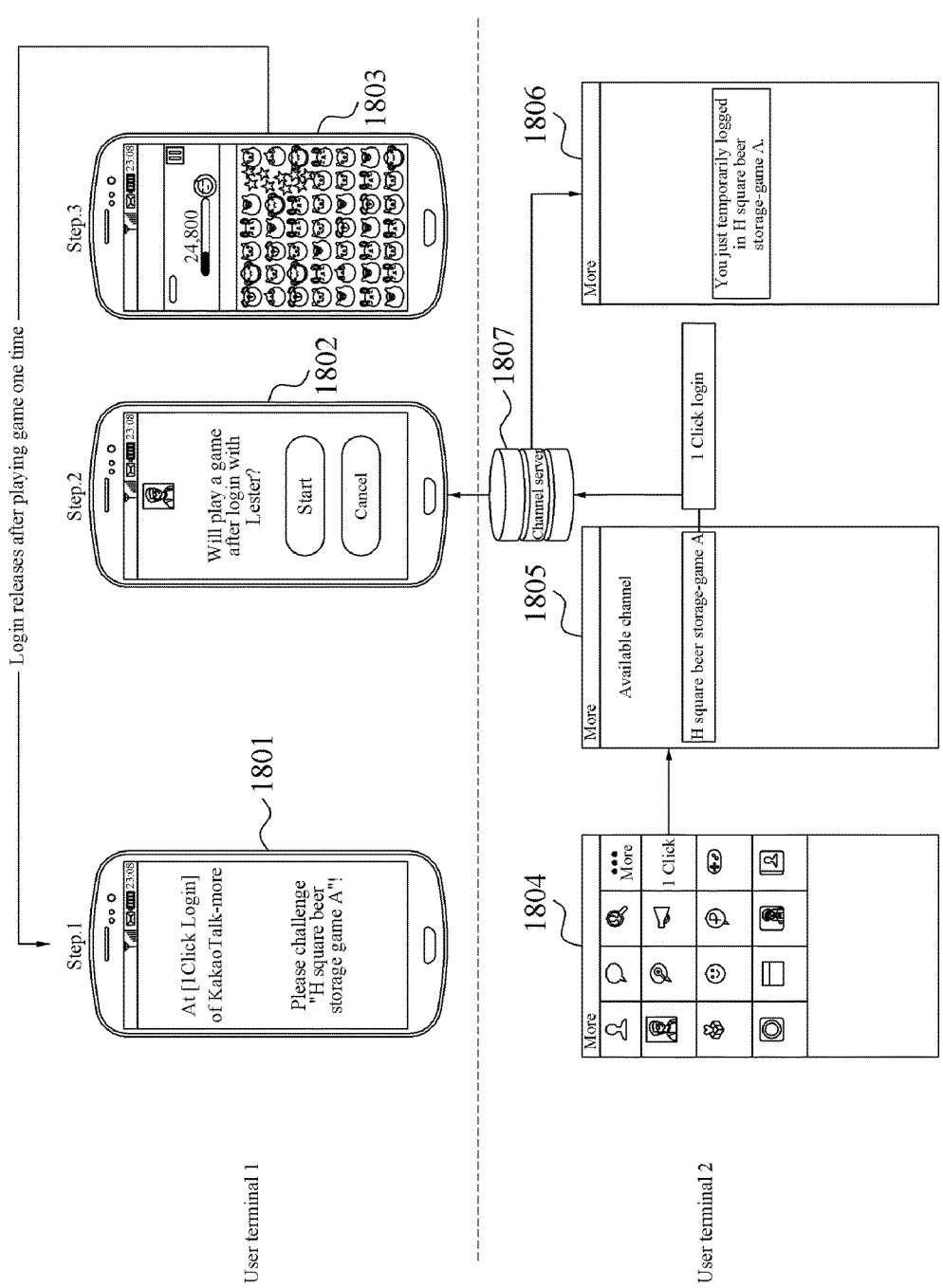
FIG. 18 illustrates a temporary login process according to an example embodiment.

FIG. 18 illustrates a temporary login process according to an example embodiment.

In FIG. 18, a first user terminal is currently connected to a display device and a second user terminal performs a temporary login through the first user terminal. Referring to a screen 1801, a message associated with the temporary login is displayed on the first user terminal at step 1. Referring to a screen 1802, a process of logging in the first user terminal with an ID "Lester" is displayed at step 2.

To this end, referring to a screen 1804, an interface, "1 click", for the temporary login is provided to the second user terminal. Referring to a screen 1805, in response to selecting the interface, "1 click", for the temporary login, a channel available based on a current location of the second user terminal may be found. Here, the first user terminal is connected to the searched channel. If the searched channel is selected, an interface that enables the second user terminal to log in the first user terminal may be provided through a channel server 1807.

Here, in response to the login, a guide message saying "temporary login is a success" is provided to the second user terminal as shown on a screen 1806. In response thereto, a content execution screen associated with a user of the second user terminal through the first user terminal connected to the display device may be displayed on the first user terminal as shown on a screen 1803. If the execution of the content is completed, the temporary login is released and a screen state may be returned to the screen 1801.

Figure 19:
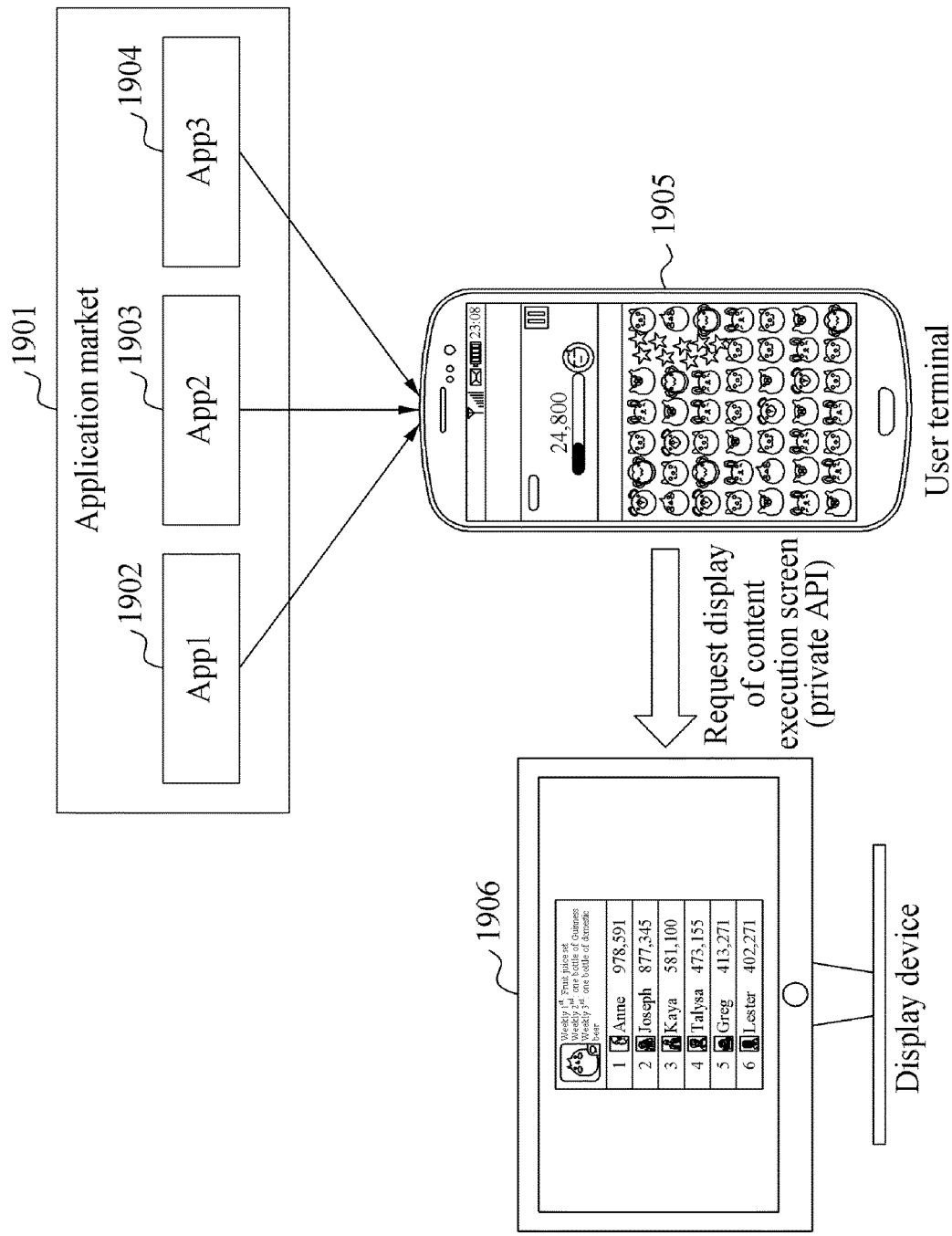
FIG. 19 illustrates a security function according to an example embodiment.

FIG. 19 illustrates a security function according to an example embodiment.

According to an example embodiment, an API may be required to display a content execution screen of a user terminal on a display device. To this end, an API capable of initiating and terminating relay of content to a display device designated at a $3^{rd}$ party application associated with the content may be required. However, if a malicious code is installed in the API, it is possible to stealthily view, for example, shoulder surfing, a screen of a specific user terminal using another device. Accordingly, a vulnerability issue such as invasion of privacy may arise.

Accordingly, a private API that operates only in an authenticated application supported at an operating system (OS) of a user terminal is to be provided. The private API is provided from a display device manufacturer, a user terminal manufacturer, and/or a communication company by limiting an application function.

To relay a content execution screen from a user terminal 1905 to a display device 1906 as shown in FIG. 19, there is a need to pre-authenticate an application that executes the content. Alternatively, there is a need to prevent a developer of a $3^{rd}$ party application from generating an application of content using the private API. That is, a vulnerable function may be provided to an authenticated specific application using the private API. The application may be installed in the user terminal through an application market 1901.

Figure 20:
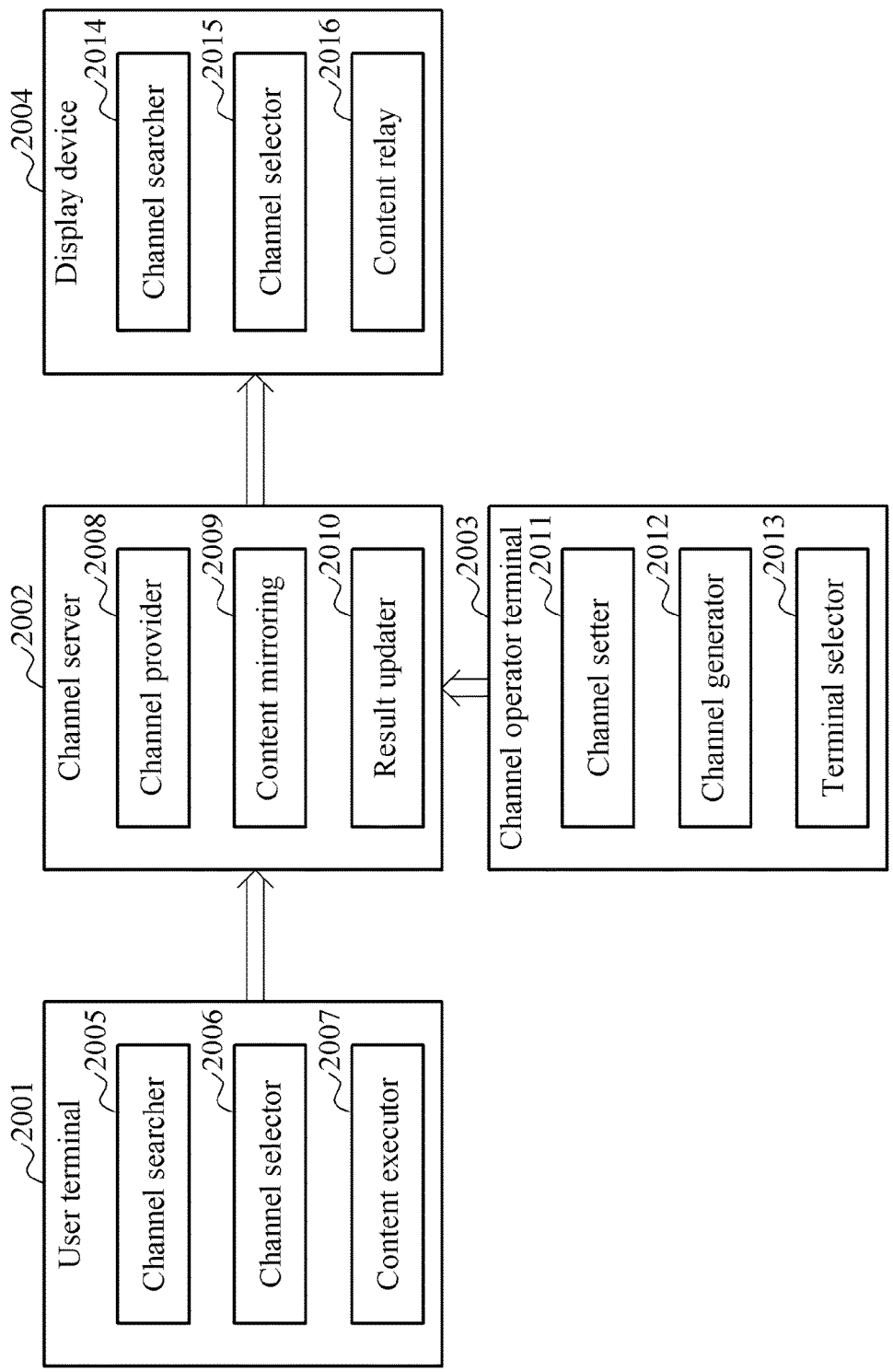
FIG. 20 is a block diagram illustrating constituent elements associated with a channel operation according to an example embodiment.

FIG. 20 is a block diagram illustrating constituent elements associated with a channel operation according to an example embodiment.

FIG. 20 illustrates a user terminal 2001, a channel server 2002, a channel operator terminal 2003, and a display device 2004. Although FIG. 20 illustrates a single user terminal 2001, one or more user terminals 2001 may be present.

The channel operator terminal 2003 may include a channel setter 2011, a channel generator 2012, and a terminal selector 2013.

The channel setter 2011 may set a plurality of options for generating a channel. Here, the plurality of options may include network ID information, for example, an SSID, a MAC address, for connecting to the channel, a channel name, a type of content and a name of content to be shared through the channel, a channel opener, a network coverage, a password for connecting to the display device 2004, a guide text associated with the channel, etc.

The channel generator 2012 may generate the channel based on the set options. Here, the channel may be generated based on an installation area of the display device 2004 or a group identifiable based on a user that is an owner of the user terminal 2001. A plurality of user terminals 2001 may connect to the channel generated at the channel operator terminal 2003, and a content execution screen displayed on each user terminal 2001 may be relayed through the display device 2004. A content execution screen displayed on one of the user terminals 2001 may be viewed by users present around the display device 2004.

If the plurality of user terminals 2001 is connected to the channel, the terminal selector 2013 may select a user terminal to be relayed to the display device 2004. For example, the terminal selector 2013 may select a user terminal based on a selection of a channel operator, a channel connection order, a random method, a terminal switching time, and the like.

The user terminal 2001 may include a channel searcher 2005, a channel selector 2006, and a content executor 2007.

The channel searcher 2005 may search for the channel generated at the channel operator terminal 2003. Here, if the user terminal 2001 is connected to a specific network through a channel and is present within a distance close from an installation area of the display device 2004 that associated with the channel, the user terminal 2001 may search for the channel. The channel may be found for each display device 2004.

The channel selector 2006 may select a channel to connect to from among the searched channels.

The content executor 2007 may execute the content through the selected channel. A content execution screen may be relayed to the display device 2004 by the channel operator terminal 2003.

The channel server 2002 may include a channel provider 2008, a content display, for example, a content mirroring, 2009, and a result updater 2010.

The channel provider 2008 may provide the channel generated at the channel operator terminal 2003 in response to a channel search of the user terminal 2001 or the display device 2004.

The content display 2009 may request the content execution screen displayed on the user terminal 2001 selected by the channel operator terminal 2004 to be relayed through and displayed on the display device 2004.

The result updater 2010 may update a content execution result processed at the user terminal 2001 for each channel or each group.

The display device 2004 may include a channel searcher 2014, a channel selector 2015, and a content relay 2016.

The channel searcher 2014 may search for a channel associated with a network connected with a display device.

The channel selector 2015 may select a single channel from among the channels found to share a content execution screen displayed on a user terminal that is connected to the channel.

The content relay 2016 may receive and display the content execution screen displayed on the user terminal that is connected to the channel.

According to example embodiments, various types of affiliated businesses may be implemented since a platform capable of using contents is supported. Also, if new content is released, it is possible to increase a content exposure opportunity through the platform.

Also, on the side of a display device manufacturer, it is possible to improve an availability of a display device and to provide various types of applications for channel management. Further, it is possible to expand sales of contents by exposing new contents through the display device.

On the side of developing contents, it is possible to support various types of promotions through a channel and to enhance revenues according to an increase in a content use opportunity.

On the side of a channel operator terminal, it is possible to provide various types of promotions through the display device and to further effectively attract customers by inducing beneficial competition between users and by giving more fun through the display device.

The channel operator terminal may charge a user terminal that connects to the channel per connection. Also, a channel server may secure various marketing areas while operating the generated channel, and may enable additional events and advertisements by controlling the display device. For example, the channel server may make additional revenues through advertisement exposure by displaying an advertisement before executing the content or by displaying the advertisement on a specific area of the display device.

The methods according to the example embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts.

Although a few example embodiments have been shown and described, the present disclosure is not limited to the described embodiments. Instead, it would be appreciated by those skilled in the art that various changes and modifications may be made to these embodiments without departing from the principles and spirit of the invention.

Therefore, the scope of the disclosure is defined not by the detailed description, but by the claims and their equivalents, and all variations within the scope of the claims and their equivalents are to be construed as being included in the disclosure.

What is claimed is:

1. A content relay method performed at a channel server, wherein the channel server includes at least one processor:
   wherein the processor configured to:
   select a channel among a plurality of channels generated at a channel operator terminal in response to a channel search request from a user terminal or a display device and provide the channel; and
   request the display device to display a content execution screen of a user terminal connected to the channel,
   wherein the channel is selected based on an option associated with the display device,
   wherein the channel is provided to share the content execution screen of the user terminal which connects the channel through the display device,
   wherein the channel is generated based on an installation area of a display device or a group that is present within a predetermined distance to the installation area of a display device,
   wherein the channel operator terminal selects a user terminal for relaying the content execution screen from among a plurality of user terminals based on channel connection priority of each user terminal, random priority, or arbitrary designation, if the plurality of user terminals is connected to the channel.

2. The method of claim 1, wherein the processor is further configured to:
   update execution results of content processed at the user terminal for each channel or each group.

3. The method of claim 1, wherein the user terminal is a service subscriber provided from an application that associates an account with the content.

4. The method of claim 1, wherein the user terminal logs in another user terminal that associated with the display device through the channel.

5. The method of claim 1, wherein the channel is connected with a user terminal present around the display device or connectible by a user terminal included in a specific group.

6. A content relay method performed at a user terminal, wherein the user terminal includes at least one processor:
   wherein the processor configured to:
   search for a plurality of channels generated at a channel operator terminal;
   select a channel among the plurality of channels in order to connect to the searched channel; and
   execute content set to the channel through connection to the selected channel,
   wherein the channel is selected based on an option associated with the display device,
   wherein the channel is provided to share the content execution screen of the user terminal which connects the channel through a display device,
   wherein the channel is generated based on an installation area of a display device or a group that is present within a predetermined distance to the installation area of a display device,
   wherein the channel operator terminal selects a user terminal for relaying the content execution screen from among a plurality of user terminals based on channel connection priority of each user terminal, random priority, or arbitrary designation, if the plurality of user terminals is connected to the channel.

7. The method of claim 6, wherein the processor searches for a channel used for relaying the content through the display device if the user terminal is connected to a network specified at the channel and is present within a distance adjacent to an installation area of the display device that associated with the channel.

8. The method of claim 6, wherein the display device relays content of a user terminal selected from a plurality of user terminals connected to the channel.

9. The method of claim 6, wherein the channel is set to the same network as a network connected with the display device.

10. The method of claim 6, wherein the processor is further configured to:
    log in another user terminal that associated with the display device through the channel.

11. A user terminal comprising:
at least one processor,
wherein the processor further configured to:
search for a plurality of channels generated at a channel operator terminal;
select a channel among the plurality of channels in order to connect to searched channel; and
execute content set to the channel through connection to the selected channel,
wherein the channel is selected based on an option associated with the display device,
wherein the channel is provided to share the content execution screen of the user terminal which connects the channel through a display device,
wherein the channel is generated based on an installation area of a display device or a group that is present within a predetermined distance to the installation area of a display device,
wherein the channel operator terminal selects a user terminal for relaying the content execution screen from among a plurality of user terminals based on channel connection priority of each user terminal, random priority, or arbitrary designation, if the plurality of user terminals is connected to the channel.

12. The user terminal of claim 11, wherein the processor searches for a channel used for relaying the content through the display device if the user terminal is connected to a network specified at the channel and is present within a distance adjacent to an installation area of the display device that associated with the channel.

13. The user terminal of claim 12, wherein the display device relays content of a user terminal selected from a plurality of user terminals connected to the channel.

14. The user terminal of claim 11, wherein the channel is set to the same network as a network connected with the display device.

15. The user terminal of claim 11, wherein the processor is further configured to log in another user terminal that is associated with the display device through the channel.

* * * * *